United States Patent
Nakajima

(10) Patent No.: US 8,984,578 B2
(45) Date of Patent: Mar. 17, 2015

(54) TRANSMITTING APPARATUS, POWER SUPPLY SWITCHING METHOD FOR TRANSMITTING APPARATUS, RECEIVING APPARATUS, AND POWER FEEDING METHOD FOR RECEIVING APPARATUS

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 906 days.

(21) Appl. No.: 12/452,621

(22) PCT Filed: Jul. 17, 2008

(86) PCT No.: PCT/JP2008/062901
§ 371 (c)(1),
(2), (4) Date: Jan. 12, 2010

(87) PCT Pub. No.: WO2009/011379
PCT Pub. Date: Jan. 22, 2009

(65) Prior Publication Data
US 2010/0135429 A1 Jun. 3, 2010

(30) Foreign Application Priority Data
Jul. 19, 2007 (JP) .................................. 2007-187984
Nov. 22, 2007 (JP) .................................. 2007-302414

(51) Int. Cl.
*H04N 7/16* (2011.01)
*G06F 3/00* (2006.01)
(Continued)

(52) U.S. Cl.
CPC . *H04N 5/63* (2013.01); *H04N 5/765* (2013.01)
USPC ........... 725/150; 725/148; 348/552; 348/723; 710/15

(58) Field of Classification Search
CPC ................. H04N 21/43615; H04N 21/43632; H04N 21/43635; H04N 21/42646; H04N 21/4135; H04N 21/4436; G09G 2370/12
USPC .......... 725/148–14, 148–153, 130, 131, 133; 710/15, 62, 65, 106, 302, 313; 345/204, 211; 348/552, 706, 725
See application file for complete search history.

(56) References Cited

U.S. PATENT DOCUMENTS
7,356,715 B2  4/2008  Okayasu
7,899,434 B2 * 3/2011  Cohen et al. ............... 455/343.1
(Continued)

FOREIGN PATENT DOCUMENTS
JP  11-224142 A  8/1999
JP  2002-237972 A  8/2002
(Continued)

OTHER PUBLICATIONS
Supplementary European Search Report EP 08791255, dated Jul. 27, 2012.
(Continued)

*Primary Examiner* — Hai V Tran
(74) *Attorney, Agent, or Firm* — Lerner, David, Littenberg, Krumholz & Mentlik, LLP

(57) ABSTRACT

To simplify a power circuit of a transmitting apparatus (source equipment) connected to a receiving apparatus (sink equipment).
Sink equipment 120 has a satisfactory power circuit 126. Initially, power is fed from source equipment 110 to the sink equipment 120. When the source equipment 110 intends to receive feed of power from the sink equipment 120, the source equipment 110 transmits request information on power feed to the sink equipment 120. The transmission is carried out using a reserved line, a power feed line, or a CEC line of a cable 130, or a high-speed bidirectional communication means. If the sink equipment 120 receives the request information on power feed, the sink equipment 120 feeds power fed the power circuit 126 to the source equipment 110. When the request information to be transmitted from the source equipment 110 to the sink equipment 120 contains pieces of information on a requested voltage value and current value, the source equipment 110 receives feed of power of the necessary voltage value and current value from the sink equipment 120.

19 Claims, 20 Drawing Sheets

(51) Int. Cl.
    *H04N 7/00*     (2011.01)
    *H04N 11/00*     (2006.01)
    *H04N 5/38*     (2006.01)
    *H04N 5/63*     (2006.01)
    *H04N 5/765*     (2006.01)

(56) References Cited

U.S. PATENT DOCUMENTS

| | | |
|---|---|---|
| 2007/0028281 A1 | 2/2007 | Frederick et al. |
| 2007/0036158 A1 | 2/2007 | Hun-Kwon et al. |
| 2009/0237561 A1* | 9/2009 | Kobayashi .................... 348/554 |

FOREIGN PATENT DOCUMENTS

| | | |
|---|---|---|
| JP | 2003-216284 A | 7/2003 |
| JP | 2005-025405 A | 1/2005 |
| JP | 2006-319503 A | 11/2006 |
| JP | 2007-129458 A | 5/2007 |

OTHER PUBLICATIONS

"High—Definition Multimedia Interface Specification Version 1.3a", Internet Citation Nov. 10, 2006, XP 009096686, Retrieved from the Internet: URL:http://www.hdmi.org/download/HDMISpecification13a.pdf.

"Vertical Blanking Interval", Jun. 10, 2007, XP 055060181, Retrieved from the Internet: URL:http://en.wikipedia.org/w/index.php?title=Vertical_blanking_interval&oldid=137324876. [Retrieved on Apr. 18, 2014].

Communication pursuant to Article 94 (3) EPC from EP Application No. 08791255.6, dated Apr. 24, 2013.

European Search Report from EP Application No. 13159848, dated May 2, 2013.

"Universal Serial Bus", Wikipedia, Jul. 17, 2007, XP 055060740, Retrieved from the Internet: URL:http://en.wikipedia.org/w/index.php?title=Universal_Serial_bus&oldid=145214279. [Retrieved on Apr. 23, 2013].

* cited by examiner

FIG.4
--PRIOR ART--

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

FIG. 5
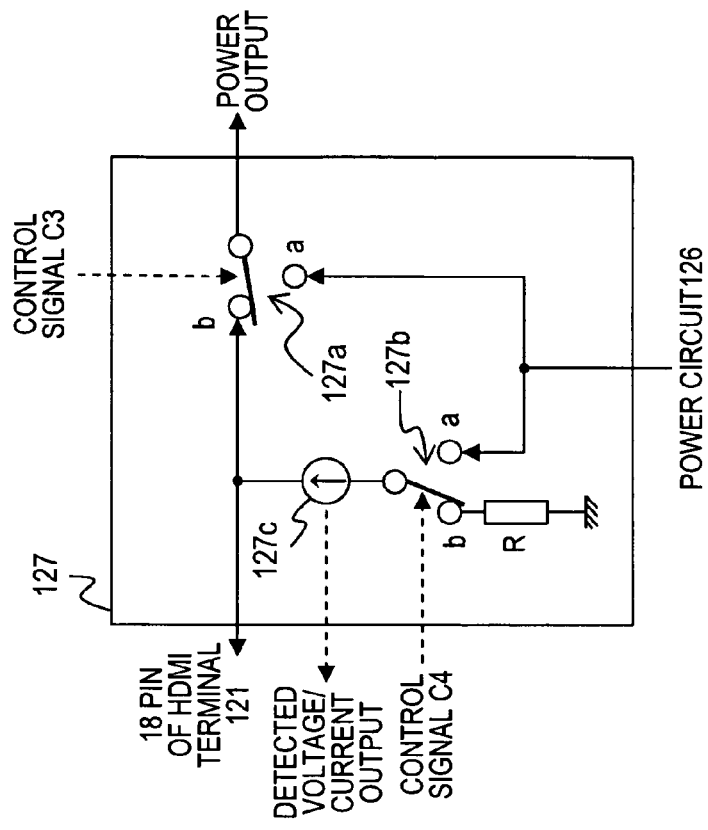
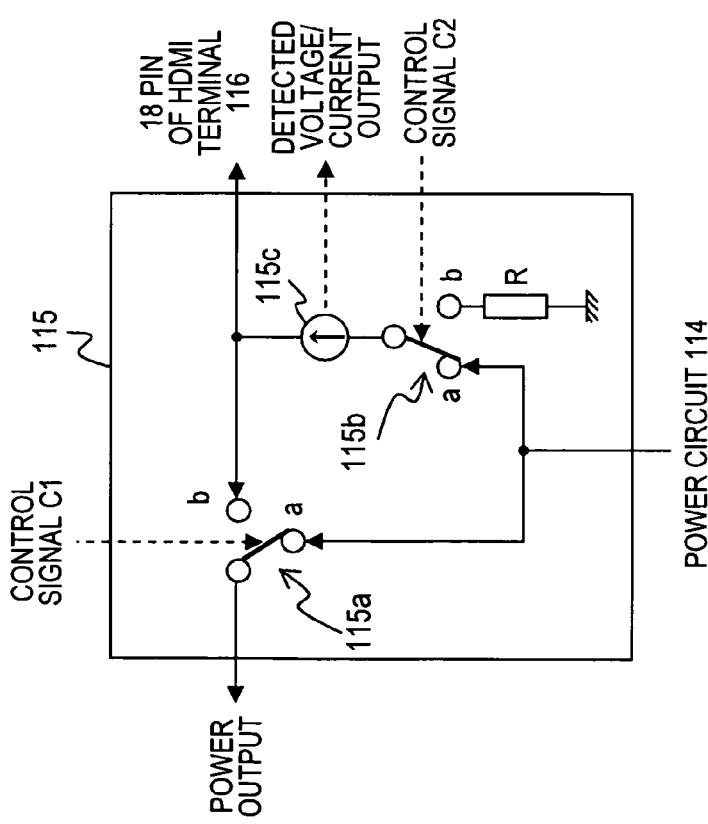

FIG. 8

| Opcode | Value | Parameters | Note |
|---|---|---|---|
| <Request Power Supply> | x 9A | [Voltage], [Max Current] | [Voltage]<br>0:0V = No need<br>1:1.5V<br>2:3.3V<br>3:5.0V<br>[Current]<br>0:0mA = No need<br>1:less 0.1A<br>2:0.1 - 0.5V<br>3:0.5 - 2.0A<br>4:2.0 - 3.0A |
| <Response Power Supply> | x 9B | [V Result], [C Result] | 0:Not available<br>1:Available |

FIG. 12

| | | |
|---|---|---|
| InfoFrame Type Code | | InfoFrame Type =03₁₆ |
| InfoFrame Version Number | | Version 01₁₆ |
| Length of Source Product Description InfoFrame | | Length of Source Product Description InfoFrame=25 |
| Data Byte 1 | 0 | Vendor Name Character 1 VN1(7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1 PD1(7bit ASCII code) |
| Data Byte 10 | 0 | Product Description Character 2 PD2 |
| Data Byte 11 | 0 | Product Description Character 3 PD3 |
| Data Byte 12 | 0 | Product Description Character 4 PD4 |
| Data Byte 13 | 0 | Product Description Character 5 PD5 |
| Data Byte 14 | 0 | Product Description Character 6 PD6 |
| Data Byte 15 | 0 | Product Description Character 7 PD7 |
| Data Byte 16 | 0 | Product Description Character 8 PD8 |
| Data Byte 17 | 0 | Product Description Character 9 PD9 |
| Data Byte 18 | 0 | Product Description Character 10 PD10 |
| Data Byte 19 | 0 | Product Description Character 11 PD11 |
| Data Byte 20 | 0 | Product Description Character 12 PD12 |
| Data Byte 21 | 0 | Product Description Character 13 PD13 |
| Data Byte 22 | 0 | Product Description Character 14 PD14 |
| Data Byte 23 | 0 | Product Description Character 15 PD15 |
| Data Byte 24 | 0 | Product Description Character 16 PD16 |
| Data Byte 25 | | Source Device Information |

| Code | Source Device InformationCode |
|---|---|
| 00h | unknown |
| 01h | Digital STB |
| 02h | DVD player |
| 03h | D-VHS |
| 04h | HDD Videorecorder |
| 05h | DVC |
| 06h | DSC |
| 07h | Video CD |
| 08h | Game |
| 09h | PC general |
| 0Ah | Blu-Ray Disc(BD) |
| 0Bh | Super Audio CD |
| 0Ch ⋮ FFh | Reserved |

US 8,984,578 B2

TRANSMITTING APPARATUS, POWER SUPPLY SWITCHING METHOD FOR TRANSMITTING APPARATUS, RECEIVING APPARATUS, AND POWER FEEDING METHOD FOR RECEIVING APPARATUS

CROSS-REFERENCES TO RELATED APPLICATIONS

The present application is a national phase entry under 35 U.S.C. §371 of International Application No. PCT/JP2008/062901 filed Jul. 17, 2008, published on Jan. 22, 2009 as WO 2009/011379 A1, which claims priority from Japanese Patent Application No. JP 2007-187984 filed in the Japanese Patent Office on Jul. 19, 2007 and Japanese Patent Application No. JP2007-302414 filed in the Japanese Patent Office on Nov. 22, 2007.

TECHNICAL FIELD

The present invention relates to a transmitting apparatus using a communication interface, for example, the high-definition multimedia interface (HDMI), a power supply switching method for the transmitting apparatus, a receiving apparatus, and a power feeding method for the receiving apparatus. More particularly, the present invention is concerned with a transmitting apparatus or the like that transmits request information, which requests power feed, to a receiving apparatus over a cable, that feeds power, which is fed from the receiving apparatus over the cable along with the transmission of the request information, to internal circuits thereof, and that thus has a power circuit thereof simplified.

BACKGROUND ART

In recent years, the HDMI has prevailed as a communication interface via which a digital video signal, that is, an uncompressed (baseband) video signal (hereinafter, referred to as image data), and a digital audio signal accompanying the video signal (hereinafter, referred to as audio data) are transmitted at a high speed from, for example, a digital versatile disc (DVD) recorder, a set-top box, or any other audiovisual (AV) source to a television set, a projector, or any other display (refer to, for example, patent document 1).

As for the HDMI, a transition minimized differential signaling (TMDS) channel on which the image data and audio data are transmitted unidirectionally from an HDMI source to an HDMI sink at a high speed, and a consumer electronics control line (CEC line) over which bidirectional communication is performed between the HDMI source and HDMI sink are stipulated.

FIG. 21 shows an example of the configuration of a conventional communication system 200. The communication system 200 includes source equipment 210 and sink equipment 220. The source equipment 210 and sink equipment 220 are connected to each other over an HDMI cable 230.

The source equipment 210 includes a control unit 211, a reproduction unit 212, an HDMI transmitting unit (HDMI source) 213, a power circuit 214, and an HDMI terminal 215. The control unit 211 controls the actions of the reproduction unit 212 and HDMI transmitting unit 213 respectively. The reproduction unit 212 reproduces baseband image data (uncompressed video signal) of a predetermined content and audio data (audio signal) accompanying the image data from a recording medium that is not shown, and feeds the data items to the HDMI transmitting unit 213. Selection of a reproductive content in the reproduction unit 212 is controlled by the control unit 211 on the basis of a user's manipulation.

The HDMI transmitting unit (HDMI source) 213 unidirectionally transmits baseband image data and audio data, which are fed from the reproduction unit 212, to the sink equipment 220 through the HDMI terminal 215 over the HDMI cable 230 by performing communication conformable to the HDMI. The power circuit 214 feeds power to the internal circuits of the source equipment 210, and feeds power to the sink equipment 220 through the HDMI terminal 215 over the HDMI cable 230.

The sink equipment 220 includes an HDMI terminal 221, a control unit 222, a memory unit 223, an HDMI receiving unit (HDMI sink) 224, and a display unit 225. The control unit 223 controls the actions of the HDMI receiving unit 224 and display unit 225 respectively. The memory unit 223 is connected to the control unit 222. In the memory unit 223, an enhanced extended display identification (E-EDID) and other information necessary to control for the control unit 222 are stored.

The HDMI receiving unit (HDMI sink) 224 receives baseband image data and audio data that are fed to the HDMI terminal 221 over the HDMI cable 230 through communication conformable to the HDMI. The HDMI receiving unit 224 feeds the received image data to the display unit 225. The HDMI receiving unit 224 also feeds the received audio data to, for example, a loudspeaker that is not shown.

A 18 pin of the HDMI terminal 215 of the source equipment 210 and a 18 pin of the HDMI terminal 221 of the sink equipment 220 are power terminals. Therefore, when the HDMI terminals 215 and 221 are connected to each other over the HDMI cable 230, power from the power supply 214 of the source equipment 210 is fed to the sink equipment 220 by way of the pin 18 of the HDMI terminal 215, the HDMI cable 230, and the 18 pin of the HDMI terminal 221.

A 19 pin of the HDMI terminal 215 of the source equipment 210 and a 19 pin of the HDMI terminal 221 of the sink equipment 220 are Hot Plug Detect (HPD) terminals. The 19 pin of the HDMI terminal 221 is connected to a +5 V power supply via a resistor of 1 kΩ. The voltage at the 19 pin of the HDMI terminal 215 is monitored by the control unit 211. Therefore, when the HDMI terminals 215 and 221 are connected to each other over the HDMI cable 230, the voltage at the 19 pin of the HDMI terminal 215 is raised. Eventually, the control unit 211 recognizes that the sink equipment 220 has been connected to the source equipment 210 over the HDMI cable 230, and initiates a predetermined action.

The operation of the communication system 200 shown in FIG. 21 will be described below. Based on a user's selecting manipulation, the reproduction unit 212 of the source equipment 210 reproduces a predetermined content. Baseband (uncompressed) image data and audio data relevant to the predetermined content obtained by the reproduction unit 212 are fed to the HDMI transmitting unit (HDMI source) 213. The HDMI transmitting unit 213 unidirectionally transmits the baseband image data and audio data to the sink equipment 220 over the HDMI cable 230 through communication conformable to the HDMI.

The HDMI receiving unit (HDMI sink) 224 of the sink equipment 220 receives the baseband image data and audio data, which are unidirectionally transmitted over the HDMI cable 230, from the source equipment 210 through communication conformable to the HDMI. The baseband (uncompressed) image data received by the HDMI receiving unit 224 is fed to the display unit 225. In the display unit 225, the image data fed from the HDMI receiving unit 224 is processed and an image represented by the image data is displayed. The baseband (uncompressed) audio data received by the HDMI receiving unit 224 is fed to a loudspeaker that is not shown, and sounds represented by the audio data are outputted.

The patent document 1 refers to JP-A-2006-319503.

DISCLOSURE OF THE INVENTION

Problem to be Solved by the Invention

The HDMI specifications stipulate a supply voltage and current so that power can be fed to equipment plugged into an HDMI terminal. The capability of power feed is restricted to source equipment in the same manner as it is in the communication system 200 shown in FIG. 21. Specifically, the HDMI specifications stipulate that power of +5 V can be fed from the source equipment to sink equipment at a minimum of 55 mA and at a maximum of 500 mA.

However, a video camera or any other compact external source equipment is presumably connected to sink equipment, which has a satisfactory power circuit, such as a television set over an HDMI cable. The compact external source equipment is highly requested to minimize the cost and housing size by simplifying the circuits thereof as greatly as possible.

Therefore, if power can be fed from sink equipment, which has a satisfactory power circuit, to external source equipment, the external source equipment need not include a large-scale power circuit, or may not hold the power circuit. Once the external source equipment is connected to the sink equipment, the capability of the external source equipment can be provided. However, if the external source equipment does not hold the power circuit, power of +5 V for Hot Plug Detect cannot be fed to the sink equipment. This poses a problem in that the sink equipment cannot recognize the fact that the source equipment has been connected thereto.

An object of the present invention is to simplify a power circuit of a transmitting apparatus (for example, external source equipment to be HDMI-connected to sink equipment) to be connected to a receiving apparatus.

Means for Solving the Problem

The concept of the present invention lies in a transmitting apparatus including:

a signal transmitting unit that transmits a video signal to a receiving apparatus over a cable in the form of differential signals on multiple channels;

an information transmitting unit that transmits request information, which requests feed of power, to the receiving apparatus over the cable; and a power supply switching unit that feeds power, which is fed from the receiving apparatus over the cable, to internal circuits thereof along with transmission of the request information of the information transmitting unit.

In the present invention, the information transmitting unit transmits the request information, which requests feed of power, to the receiving apparatus over the cable. For example, the request information is transmitted using a predetermined line out of multiple lines, which constitute the cable, other than a line to be used to transmit the video signal and a line to be used to feed power. For example, the request information is transmitted using the line, which is used to feed power, out of the multiple lines constituting the cable.

For example, the request information is transmitted using a line, which is used to transmit a control signal, out of the multiple lines constituting the cable. For example, the request information is transmitted over a high-speed bidirectional communication means that uses a predetermined line out of the multiple lines, which constitute the cable, other than the line to be used to transmit the video signal, and the line to be used to feed power. For example, the predetermined line is a reserved line or an HPD line included in the HDMI cable. For example, the request information is transmitted while being inserted into the blanking period of the video signal to be transmitted by the signal transmitting unit.

When power is fed from the receiving apparatus along with transmission of request information, the power supply switching unit feeds power, which is fed from the receiving apparatus, to the internal circuits. For example, the power circuit, and a power feeding unit that feeds power, which is sent from the power circuit, to the receiving apparatus over the cable are included. The power supply switching unit feeds the power, which is fed from the receiving apparatus over the cable, to the internal circuits in place of the power fed from the power circuit. In this case, the power circuit can be formed with, for example, a battery circuit alone but does not require an AC adaptor or the like. Eventually, the power circuit can be simplified.

For example, a power feeding unit that feeds power, which is fed from the receiving apparatus over a first line included in the cable, to the internal circuits, and also feeds the power to the receiving apparatus over a second line included in the cable is included. The power supply switching unit feeds the power, which is fed from the receiving apparatus over the second line included in the cable, together with the power, which is fed from the receiving apparatus over the first line included in the cable, to the internal circuits.

In this case, even if a power circuit is not included, power of +5 V for Hot Plug Detect can be fed to the receiving apparatus, and the receiving apparatus can verify that the transmitting apparatus has been connected thereto. When the request information is transmitted to the receiving apparatus, power is fed from the receiving apparatus over the first line and second line included in the cable. Therefore, a case where a necessary amount of current is large can be coped with.

In the present invention, for example, the request information to be transmitted by the information transmitting unit may include at least control information on a voltage value or a current value. In this case, the receiving apparatus can control the voltage value or current value of power to be fed to the transmitting apparatus. The transmitting apparatus can receive feed of power of the necessary voltage value or current value from the receiving apparatus.

Another concept of the present invention lies in a receiving apparatus including:

a signal receiving unit that receives a video signal, which is sent over a cable in the form of differential signals on multiple channels, from a transmitting apparatus;

a power obtaining unit that obtains power fed from the transmitting apparatus over the cable;

a power circuit;

an information receiving unit that receives request information which is sent from the transmitting apparatus over the cable in order to request feed of power; and a power feeding unit that feeds the power, which is fed from the power circuit, to the transmitting apparatus over the cable along with the reception of the request information by the information receiving unit.

In the present invention, the information receiving unit receives the request information which is sent from the transmitting apparatus in order to request feed of power. Along with the reception of the request information, the power feeding unit feeds power, which is fed from the power circuit, to the transmitting apparatus. In the present invention, power is fed to the transmitting apparatus in response to the request for power feed sent from the transmitting apparatus. The transmitting apparatus has the power circuit formed with, for example, a battery circuit alone but does not need an AC adaptor or the like. Thus, the power circuit can be simplified.

In the present invention, for example, the request information received by the information receiving unit includes at least control information on a voltage value or a current value. A power control unit that controls power, which is fed from the power circuit to the transmitting apparatus through the power feeding unit, according to the control information may be further included. In this case, power of the voltage value or current value needed by the transmitting apparatus can be fed to the transmitting apparatus.

Another concept of the present invention lies in a receiving apparatus including:

a signal receiving unit that receives a video signal, which is sent over a cable in the form of differential signals on multiple channels, from a transmitting apparatus;

a power obtaining unit that obtains the power which is fed from the transmitting apparatus over the cable;

a power circuit;

an information receiving unit that receives request information which is sent from the transmitting apparatus over the cable in order to request feed of power; and a power feeding unit that feeds power, which is fed from the power circuit, to the transmitting apparatus over a first line included in the cable, that when the information receiving unit receives the request information, feeds the power, which is fed from the power circuit, to the transmitting apparatus over a second line included in the cable.

In the present invention, the power feeding unit feeds power, which is fed from the power circuit, to the transmitting apparatus over the first line included in the cable. Therefore, the transmitting apparatus may not hold the power circuit. In the present invention, along with reception of the request information that is sent from the transmitting apparatus in order to request feed of power, the power feeding unit feeds the power, which is fed from the power circuit, to the transmitting apparatus over the second line included in the cable. Therefore, a case where an amount of current requested by the transmitting apparatus is large can be coped with.

In the present invention, for example, the request information to be received by the information receiving unit includes at least control information on a voltage value or a current value. A power control unit that controls the power, which is fed from the power circuit to the transmitting apparatus through the power feeding unit, according to the control information may be further included. In this case, power of the voltage value or current value needed by the transmitting apparatus can be fed to the transmitting apparatus.

Advantage Of The Invention

According to the present invention, a transmitting apparatus transmits request information, which requests power feed, to a receiving apparatus over a cable. Power to be fed from the receiving apparatus over the cable along with transmission of the request information is fed to the internal circuits. Therefore, a power circuit can be simplified.

BRIEF DESCRIPTION OF THE DRAWINGS

FIG. 4 is a diagram showing a pin configuration (type A) of an HDMI terminal;

FIG. 5 includes diagrams showing examples of configurations of switching circuits that are included in source equipment and sink equipment respectively in order to switch power supplies;

FIG. 8 is a diagram showing control data structures of a power feed request <Request Power Supply> and a power feed response <Response Power Supply> that are CEC commands;

FIG. 12 is a diagram showing the configuration of SPD InfoFrame;

Figure 1:
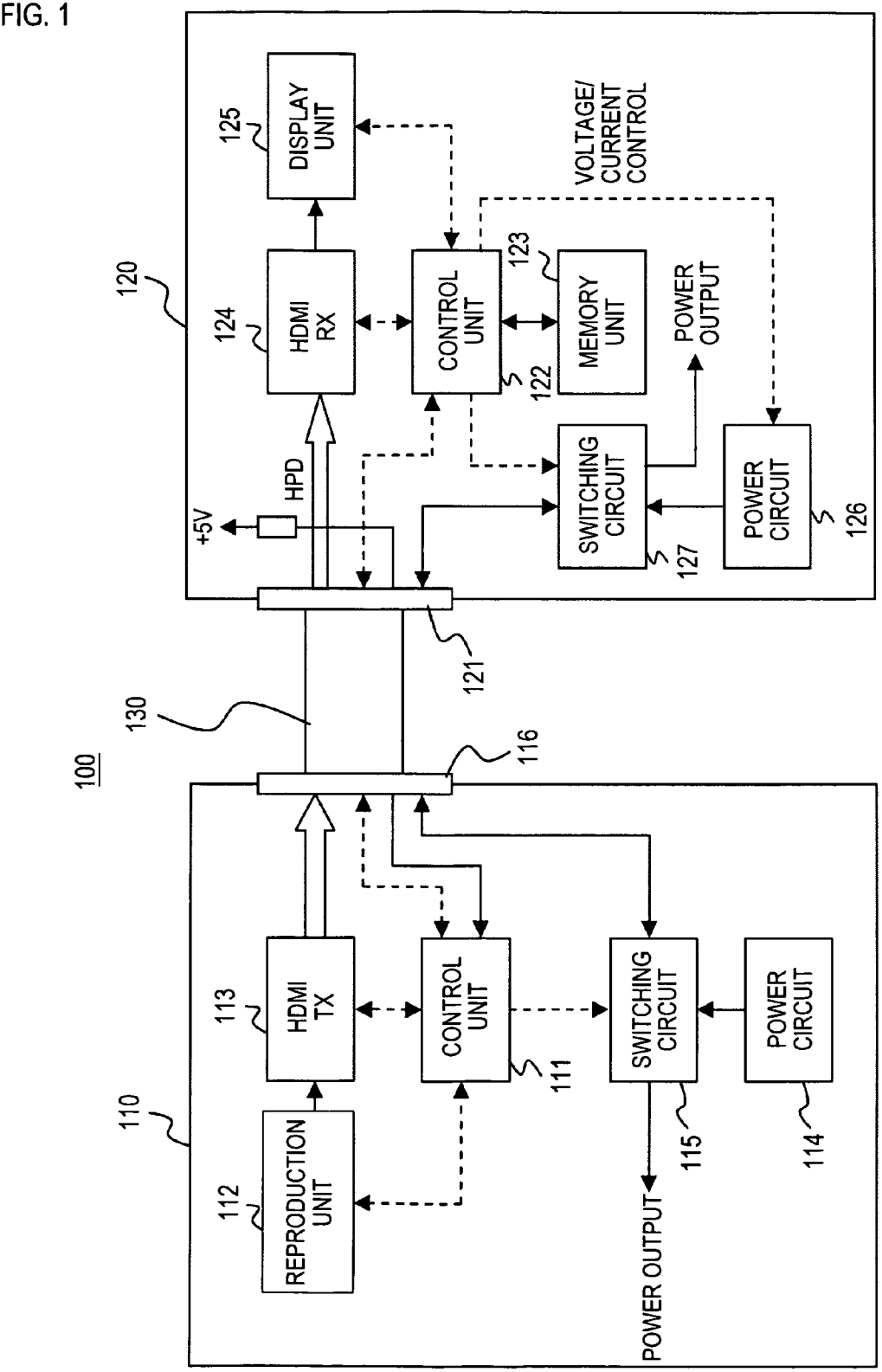
FIG. 1 is a block diagram showing an example of the configuration of a communication system, which employs an HDMI interface, in accordance with an embodiment of the present invention.

DESCRIPTION OF REFERENCE NUMERALS 100, 100A: communication system, 110, 110A: source equipment, 111: control unit, 112: reproduction unit, 113: HDMI transmitting unit (HDMI source), 114: power circuit, 115, 115A: switching circuit, 116: HDMI terminal, 120, 120A: sink equipment, 121: HDMI terminal, 122: control unit, 123: memory unit, 124: HDMI receiving unit (HDMI sink), 125: display unit, 126: power circuit, 127: switching circuit, 400: high-speed bidirectional communication means, 501: reserved line, 502: HPD line.

Best Mode for Carrying Out the Invention

Referring to the drawings, an embodiment of the present invention will be described below. FIG. 1 shows an example of the configuration of a communication system 100 that is an embodiment.

The communication system 100 includes source equipment 110 and sink equipment 120. The source equipment 110 and sink equipment 120 are connected to each other over an HDMI cable 130. For example, the source equipment 110 is battery-driven mobile equipment such as a digital camera recorder or a digital still camera, though an imaging unit and a recording unit are not shown. The sink equipment 120 is a television set having a satisfactory power circuit.

The source equipment 110 includes a control unit 111, a reproduction unit 112, an HDMI transmitting unit (HDMI source) 113, a power circuit 114, a switching circuit 115, and an HDMI terminal 116. The control unit 111 controls the actions of the reproduction unit 112 the HDMI transmitting unit 113 and switching circuit 115 respectively. The reproduction unit 112 reproduces baseband image data (uncompressed video signal) of a predetermined content and audio data (audio signal), which accompanies the image data, from a recording medium that is not shown, and feeds the data items to the HDMI transmitting unit 113. Selection of a reproductive content by the reproduction unit 112 is controlled by the control unit 111 on the basis of a user's manipulation.

The HDMI transmitting unit (HDMI source) 113 unidirectionally transmits the baseband image data and audio data, which are fed from the reproduction unit 112, to the sink equipment 220 through the HDMI terminal 116 over the HDMI cable 130 by performing communication conformable to the HDMI. The HDMI transmitting unit 113 will be detailed later.

The power circuit 114 generates power to be fed to the internal circuits of the source equipment 210 and the sink equipment 120. The power circuit 114 is, for example, a battery circuit that generates power from a battery. The switching circuit 115 selectively feeds power, which is generated by the power circuit 114, to the internal circuits and the sink equipment 120, and selectively feeds power, which is fed from the sink equipment 120, to the internal circuits. The switching circuit 115 forms a power feeding unit and a power switching unit. The switching circuit 115 will be detailed later.

The sink equipment 120 includes an HDMI terminal 121, a control unit 122, a memory unit 123, an HDMI receiving unit (HDMI sink) 124, a display unit 125, a power circuit 126, and a switching circuit 127. The control unit 121 controls the actions of the HDMI receiving unit 124, display unit 125, power circuit 126, and switching circuit 127 respectively. The memory unit 123 is connected to the control unit 122. In the memory unit 123, an enhanced extended display identification (E-EDID) and other information necessary to control for the control unit 122 are stored.

The HDMI receiving unit (HDMI sink) 124 receives baseband image data and audio data, which are fed to the HDMI terminal 121 over the HDMI cable 130, through communication conformable to the HDMI. The HDMI receiving unit 124 feeds the received image data to the display unit 125. The HDMI receiving unit 124 feeds the received audio data to, for example, a loudspeaker that is not shown. The HDMI receiving unit 124 will be detailed later.

The power circuit 126 generates power that is fed to the internal circuits of the sink equipment 120 and the source equipment 110. The power circuit 126 is, for example, a satisfactory power circuit that generates power (direct-current power) from AC power. The switching circuit 127 selectively feeds power, which is generated by the power circuit 126, to the internal circuits and the source equipment 110, and selectively feeds power, which is fed from the source equipment 110 to the sink equipment 120, to the internal circuits. The switching circuit 127 forms a power feeding unit. The switching circuit 127 will be detailed later.

Figure 2:
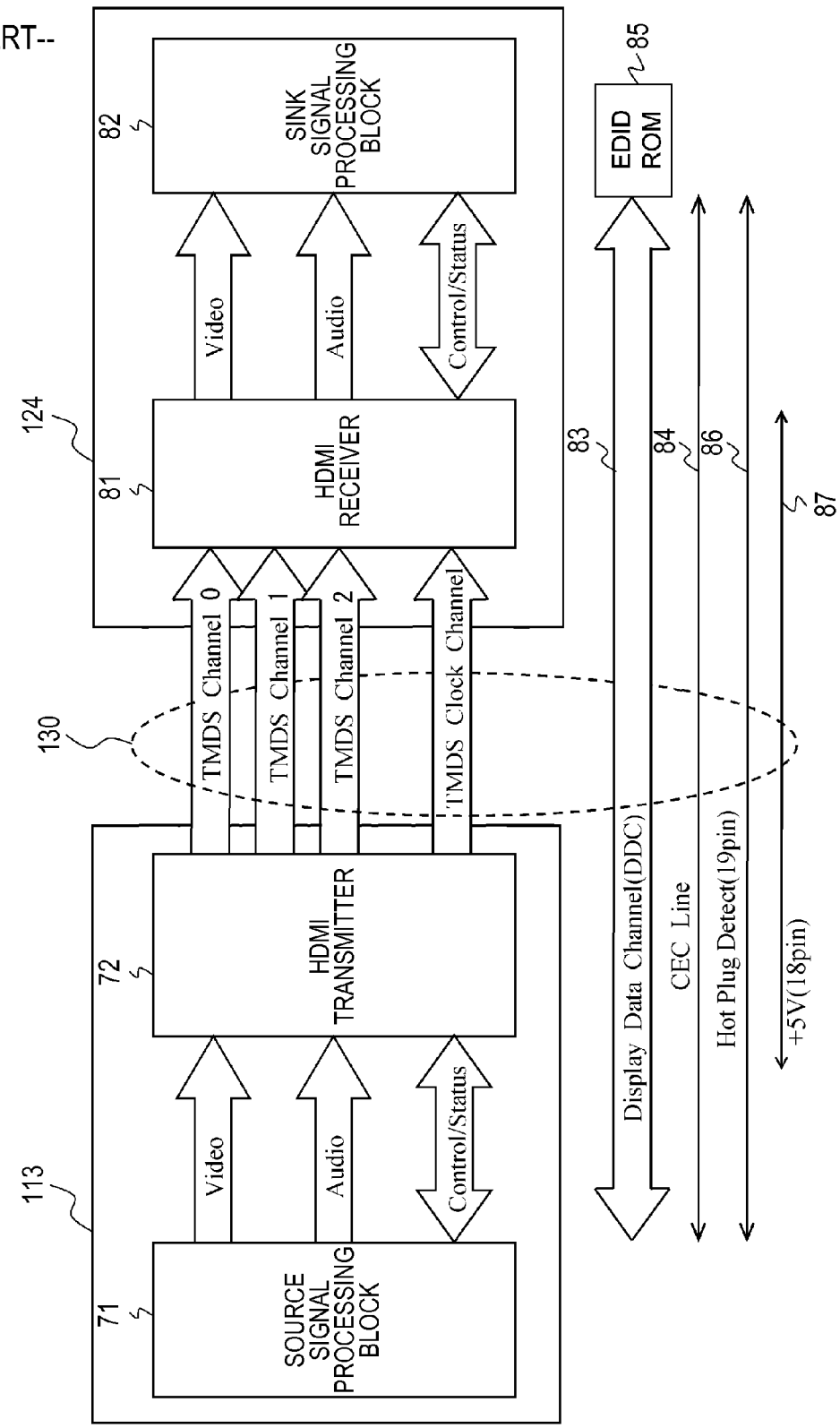
FIG. 2 is a block diagram showing an example of the configurations of an HDMI source and an HDMI sink.

FIG. 2 shows an example of the configurations of the HDMI transmitting unit (HDMI source) 113 of the source equipment 110 included in the communication system 100 shown in FIG. 1, and of the HDMI receiving unit (HDMI sink) 124 of the sink equipment 120 included therein.

The HDMI transmitting unit 113 unidirectionally transmits differential signals of baseband (uncompressed) image data for one screen to the HDMI receiving unit 124 on multiple channels during a valid image interval (hereinafter, may be referred to as an active video interval) that is an interval obtained by subtracting a horizontal blanking period and a vertical blanking period from an interval (hereinafter, may be referred to as a video field) from a certain vertical synchronizing (sync) signal to the next vertical sync signal. The HDMI transmitting unit 113 unidirectionally transmits differential signals, which represent auxiliary data including audio data that accompanies the image data, a control packet, and others, to the HDMI receiving unit 124 on multiple channels during the horizontal blanking period and vertical blanking period.

The HDMI transmitting unit 113 includes a source signal processing block 71 and an HDMI transmitter 72. Baseband or uncompressed image data and audio data (Audio) are fed from the reproduction unit 112 (see FIG. 1) to the source signal processing block 71. The source signal processing block 71 performs necessary processing on the fed image data and audio data, and feeds the resultant data items to the HDMI transmitter 72. The source signal processing block 71 transfers, if necessary, information for control or information on a status (control information or status information) to or from the HDMI transmitter 72.

The HDMI transmitter 72 converts image data, which is fed from the source signal processing block 71, to representative differential signals, and unidirectionally transmits the differential signals to the HDMI receiving unit 124, which is connected over the HDMI cable 130, on multiple channels that are three TMDS channels #0, #1, and #2.

Further, the HDMI transmitter 72 converts auxiliary data including audio data that accompanies uncompressed image data, a control packet, and others, or control data including a vertical sync signal (VSYNC) and a horizontal sync signal (HSYNC), which are fed from the transmitter 72 and source signal processing block 71, into representative differential signals, and unidirectionally transmits the differential signals to the HDMI receiving unit 124, which is connected over the HDMI cable 130, on the three TMDS channels #0, #1, and #2.

The transmitter 72 transmits a pixel clock, which is synchronous with the image data transmitted on the three TMDS channels #0, #1, and #2, to the HDMI receiving unit 124, which is connected over the HDMI cable 130, on a TMDS channel.

During the active video interval, the HDMI receiving unit 124 receives the differential signals, which represent the image data and are unidirectionally transmitted from the HDMI transmitting unit 113, on the multiple channels. During the horizontal blanking period and vertical blanking period, the HDMI receiving unit 124 receives the differential signals, which represent the auxiliary data or control data and are transmitted from the HDMI transmitting unit 113, on the multiple channels.

The HDMI receiving unit 124 includes an HDMI receiver 81 and a sink signal processing block 82. The HDMI receiver 81 receives the differential signals representative of the image data and the differential signals representative of the auxiliary data or control data, which are unidirectionally transmitted on the TMDS channels #0, #1, and #2 from the HDMI transmitting unit 113 connected over the HDMI cable 130, synchronously with the pixel clock transmitted on the TMDS clock channel from the HDMI transmitting unit 113. Further, the HDMI receiver 81 converts the differential signals into the represented image data, auxiliary data, or control data, and if necessary feeds the data to the sink signal processing block 82.

The sink signal processing block 82 performs necessary processing on the data fed from the HDMI receiver 81, and feeds the resultant data to the display unit 125. If necessary, the sink signal processing block 82 transfers information for control or information on a status (control information or status information) to or from the HDMI receiver 81.

In addition to the three TMDS channels #0, #1, and #2 on which image data, auxiliary data, or control data is unidirectionally serially transmitted from the HDMI transmitting unit 113 to the HDMI receiving unit 124 synchronously with the pixel clock, and the TMDS clock channel that is a transmission channel on which the pixel clock is transmitted, the HDMI transmission channels include a display data channel (DDC) 83 and a transmission channel called the CEC line 84.

The DDC 83 is formed with two lines (signal lines) that are not shown and are included in the HDMI cable 130, and is used when the source equipment 110 reads the enhanced extended display identification (E-EDID) from the connected sink equipment 120 over the HDMI cable 130.

Specifically, the sink equipment 120 has an EDID ROM 85 incorporated in the memory unit 123 (see FIG. 1). The source equipment 110 reads the E-EDID, which is stored in the EDID ROM 85, from the sink equipment 120, which is connected over the HDMI cable 130, along the DDC 83, and recognizes the settings and performance of the sink equipment 120 on the basis of the E-EDID.

The CEC line 84 is formed with one line that is included in the HDMI cable 130 but is not shown, and is used to perform bidirectional communication of control data between the source equipment 110 and sink equipment 120.

A line 86 coupled to a pin called a Hot Plug Detect (HPD) pin is included in the HDMI cable 130. The source equipment 110 can detect the connection of the sink equipment 120 by utilizing the line 86. In addition, a line 87 to be used to feed power from the source equipment 110 to the sink equipment 120 or feed power from the sink equipment 120 to the source equipment 110 in the present embodiment is included in the HDMI cable 130.

Figure 3:
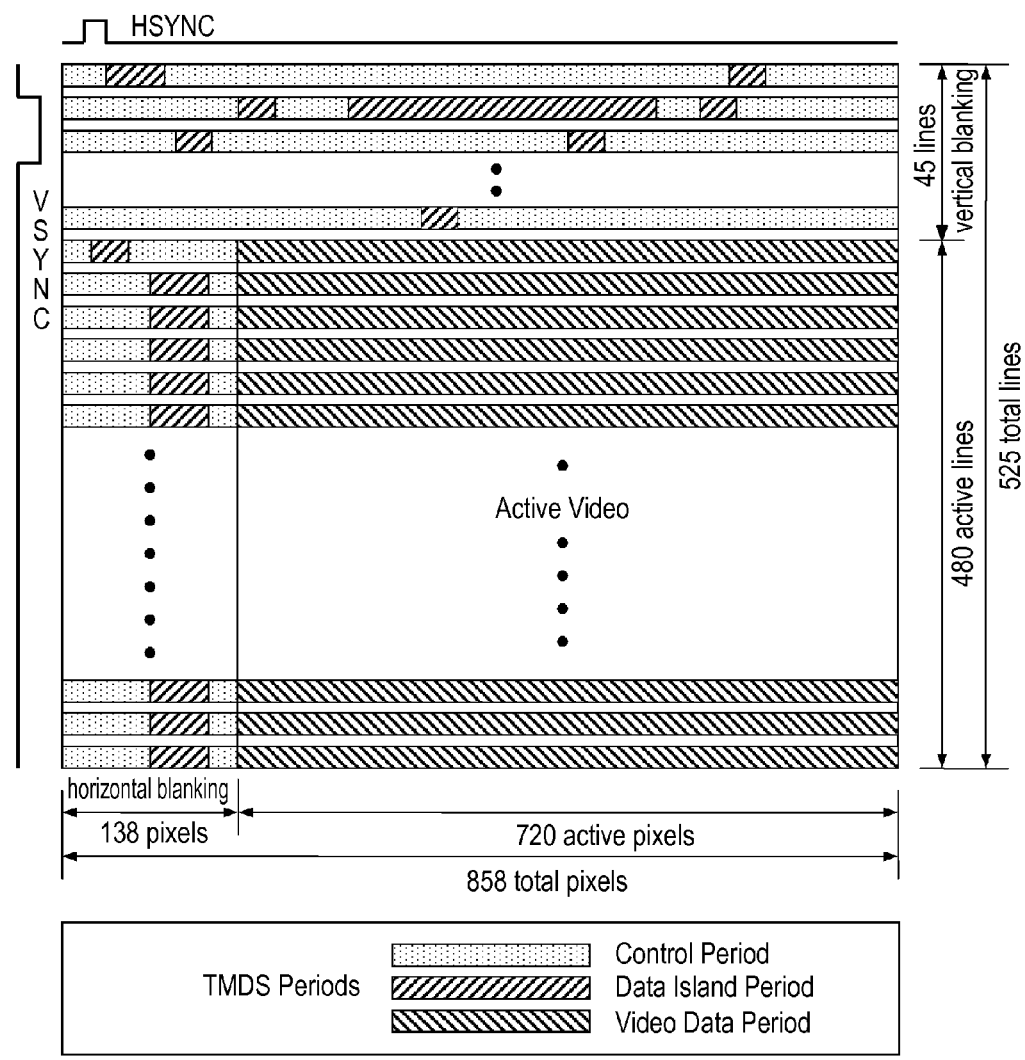
FIG. 3 is a diagram showing the structure of TMDS transmissive data.

FIG. 3 shows an example of transmission intervals (periods) during which various kinds of transmissive data items are transmitted on the three TMDS channels #0, #1, and #2 conformable to the HDMI. FIG. 3 shows the intervals for the various kinds of transmissive data items in a case where a progressive image of 720 pixels arrayed sideways×480 pixels arrayed lengthwise is transmitted on the TMDS channels #0, #1, and #2.

A video field in which the transmissive data items are transmitted on the three TMDS channels #0, #1, and #2 conformable to the HDMI, there are three intervals of a video data interval (period), a data island interval (period), and a control interval (period) in association with the kinds of transmissive data items.

The video field interval is an interval from the leading edge (active edge) of a certain vertical sync signal to the leading edge of the next vertical sync signal, and falls into the horizontal blanking period, the vertical blanking period, and an active video interval that is an interval obtained by subtracting the horizontal blanking period and vertical blanking period from the video field interval.

The video data interval is allocated to the active video interval. During the video data interval, data of valid pixels (active pixels) of 720 pixels×480 lines constituting uncompressed image data for one screen is transmitted.

The data island interval and control interval are allocated to the horizontal blanking period and vertical blanking period. During the data island interval and control interval, auxiliary data is transmitted.

Specifically, the data island interval is allocated to part of the horizontal blanking period and part of the vertical blanking period. During the data island interval, data unrelated to control out of the auxiliary data, for example, a packet of audio data is transmitted.

The control interval is allocated to the other part of the horizontal blanking period and the other part of the vertical blanking period. During the control interval, data related to control out of the auxiliary data, for example, the vertical sync signal, horizontal sync signal, and control packet are transmitted.

In the ongoing HDMI, the frequency of the pixel clock to be transmitted on the TMDS clock channel is, for example, 165 MHz. In this case, the transmission rate for the data island interval is on the order of approximately 500 Mbps.

FIG. 4 shows a pin configuration for the HDMI terminals 116 and 121. The pin configuration is called a type-A pin configuration.

Two lines that are differential lines, over which differential signals TMDS Data#i+ and TMDS Data#i− on TMDS channels #i are transmitted, are coupled to pins to which the signals TMDS Data#i+ are assigned (pins of pin numbers 1, 4, and 7) and pins to which the signals TMDS Data#i− are assigned (pins of pin numbers 3, 6, and 9).

The CECE line 84 over which a CEC signal of control data is transmitted is coupled to a pin of a pin number 13. A pin of a pin number 14 is unused (reserved). A line over which a serial data (SDA) signal such as an E-EDID is transmitted is coupled to a pin of a pin number 16. A line over which a serial clock (SCL) signal that is a clock signal to be used for synchronization of transmission or reception of the SDA signal is transmitted is coupled to a pin of a pin number 15. The DDC 83 is formed with a line over which the SDA signal is transmitted and a line over which the SCL signal is transmitted.

A line 86 over which the source equipment 110 detects connection of the sink equipment 120 as described above is coupled to a pin of a pin number 19. A line 87 over which power is fed as described above is coupled to a pin of a pin number 18.

In the communication system 100 shown in FIG. 1, the 18 pins of the HDMI terminal 116 of the source equipment 110 and of the HDMI terminal 121 of the sink equipment 120 are power terminals. Therefore, when the HDMI terminals 116 and 121 are connected to each other over the HDMI cable 130, power fed from the power circuit 114 of the source equipment 110 can be fed to the sink equipment 120. Further, power fed from the power circuit 126 of the sink equipment 120 can be fed to the source equipment 110.

The 19 pin of the HDMI terminal 116 of the source equipment 110 and the 19 pin of the HDMI terminal 121 of the sink equipment 120 are Hot Plug Detect (HPD) terminals. The 19 pin of the HDMI terminal 121 is connected to the +5 V power supply via a resistor of 1 kΩ. The voltage at the 19 pin of the HDMI terminal 116 is monitored by the control unit 111. When the HDMI terminals 116 and 121 are connected to each other over the HDMI cable 130, the voltage at the 19 pin of the HDMI terminal 116 is raised. Therefore, the control unit 111 recognizes that the sink equipment 120 has been connected to the source equipment 110 by way of the HDMI equipment 130, and begins a predetermined action.

An operation of the communication system 100 shown in FIG. 1 to be performed when image data and audio data accompanying the image data are transmitted from the source equipment 110 to the sink equipment 120 will be described below.

The reproduction unit 112 of the source equipment 110 performs reproduction of a predetermined content on the basis of a user's selecting manipulation. Baseband (uncompressed) image data and audio data representing the predetermined content obtained by the reproduction unit 112 are fed to the HDMI transmitting unit (HDMI source) 113. The HDMI transmitting unit 113 unidirectionally transmits the baseband image data and audio data to the sink equipment 120 over the HDMI cable 130 through communication conformable to the HDMI.

The HDMI receiving unit (HDMI sink) 124 of the sink equipment 120 receives the baseband image data and audio data, which are unidirectionally sent over the HDMI cable 130, from the source equipment 110 through communication conformable to the HDMI. The baseband (uncompressed) image data received by the HDMI receiving unit 124 is fed to the display unit 125. In the display unit 125, the image data fed from the HDMI receiving unit 124 is processed, and an image represented by the image data is displayed. The baseband (uncompressed) audio data received by the HDMI receiving unit 124 is fed to a loudspeaker that is not shown, and sounds represented by the audio data are outputted.

Next, power feed between the source equipment 110 and sink equipment 120 in the communication system 100 shown in FIG. 1 will be described below. Initially, the communication system 100 shown in FIG. 1 is placed in a state in which power is fed from the power circuit 114 of the source equipment 110 to the sink equipment 120. Thereafter, when request information requesting power feed is transmitted from the source equipment 110 to the sink equipment 120, the state is changed to a state in which power is fed from the sink equipment 120 to the source equipment 110.

FIG. 5(*a*) shows an example of the configuration of the switching circuit 115 of the source equipment 110. The switching circuit 115 includes two selection switches 115*a* and 115*b*. Power fed from the power circuit 114 is fed to a stationary terminal on the side a of the selection switch 115*a*, and also fed to a stationary terminal on the side a of the selection switch 115*b*. The power is fed to the internal circuits through the movable terminal of the selection switch 115*a*. The stationary terminal on the side b of the selection switch 115*a* is connected to the 18 pin of the HDMI terminal 116.

The stationary terminal on the side b of the selection switch 115*b* is grounded via a resistor R. The movable terminal of the selection switch 115*b* is connected to the 18 pin of the HDMI terminal 116 via a voltage/current detector 115*c*. The detected output of a voltage/current detected by the voltage/current detector 115*c* is fed to and monitored by the control unit 111.

Switching of the selection switch 115*a* is controlled with a control signal C1 fed from the control unit 111. Likewise, switching of the selection switch 115*b* is controlled with a control signal C2 fed from the control unit 111. Specifically, the selection switches 115*a* and 115*b* have the sides a thereof initially connected. Thereafter, when request information requesting power feed is transmitted from the source equipment 110 to the sink equipment 120, the selection switches 115*a* and 115*b* have the sides b thereof connected.

FIG. 5(*b*) shows an example of the configuration of the switching circuit 127 of the sink equipment 120. The switching circuit 127 includes two selection switches 127*a* and 127*b*. Power fed from the power circuit 126 is fed to the stationary terminal on the side a of the selection switch 127*a*, and also fed to the stationary terminal on the side a of the selection switch 127*b*. The power is fed to the internal circuits through the movable terminal of the selection switch 127*a*. The stationary terminal on the side b of the selection switch 127*a* is connected to the 18 pin of the HDMI terminal 121.

The stationary terminal on the side b of the selection switch 127*b* is grounded via a resistor R. The movable terminal of the selection switch 127*b* is connected to the 18 pin of the HDMI terminal 121 via a voltage/current detector 127*c*. The detected output of a voltage/current detected by the voltage/current detector 127*c* is fed to and monitored by the control unit 122.

Switching of the selection switch 127*a* is controlled with a control signal C3 fed from the control unit 122. Likewise, switching of the selection switch 127*b* is controlled with a control signal C4 fed from the control unit 122. Specifically, the selection switches 127*a* and 127*b* initially have the sides b thereof connected. Thereafter, when request information requesting power feed is transmitted from the source equipment 110 to the sink equipment 120, the selection switches 127*a* and 127*b* have the sides a thereof connected.

The switching circuit 115 of the source equipment 110 and the switching circuit 127 of the sink equipment 120 have the foregoing configurations, and power feed in the source equipment 110 and sink equipment 120 is carried out as mentioned below. Specifically, initially, the selection switches 115*a* and 115*b* of the source equipment 110 have the sides a thereof connected, and the selection switches 127*a* and 127*b* of the sink equipment 120 have the sides b thereof connected. Therefore, power fed from the power circuit 114 of the source equipment 110 is fed to the internal circuits of the source equipment 110 via the selection switch 115*a* of the switching circuit 115. Power fed from the power circuit 114 of the source equipment 110 is fed to the 18 pin of the HDMI terminal 116 via the selection switch 115b of the switching circuit 115. Further, the power is fed to the 18 pin of the HDMI terminal 121 of the sink equipment 120 over the HDMI cable 130, and further fed to the internal circuits of the sink equipment 120 via the selection switch 127a of the switching circuit 127.

Thereafter, when request information requesting feed of power is transmitted from the source equipment 110 to the sink equipment 120, the selection switches 115a and 115b of the source equipment 110 have the sides b thereof connected, and the selection switches 127a and 127b of the sink equipment 120 have the sides a thereof connected. Therefore, power fed from the power circuit 126 of the sink equipment 120 is fed to the internal circuits of the sink equipment 120 via the selection switch 127a of the switching circuit 127. The power fed from the power circuit 126 of the sink equipment 120 is fed to the 18 pin of the HDMI terminal 121 via the selection switch 127b of the switching circuit 127. Further, the power is fed to the 18 pin of the HDMI terminal 116 of the source equipment 110 over the HDMI cable 130, and further fed to the internal circuits of the source equipment 110 via the selection switch 115a of the switching circuit 115. Incidentally, to the internal circuits of the sink equipment 120, power of +5 V from the power circuit 126 of the sink equipment 120 is fed.

Next, request information on power feed to be transmitted from the source equipment 110 to the sink equipment 120 will be described below. The request information on power feed is transmitted from the source equipment 110 to the sink equipment 120 on the basis of a user's manipulation or remaining battery capacity information on the battery forming the power circuit 114 according to any of, for example, the first to fifth control methods described below.

(1) First Control Method

The source equipment 110 uses the line of the HDMI cable 130, which is coupled to an unused (reserved) pin, to transmit request information on power feed to the sink equipment 120. In this case, the control unit 111 of the source equipment 110 changes the voltage at the 14 pin of the HDMI terminal 116 from a low level to a high level, and thus transmits the request information on power feed to the sink equipment 120. In this case, the control unit 122 of the sink equipment 120 monitors the voltage at the 14 pin of the HDMI terminal 121. When the voltage changes the level thereof from the low level to the high level, the control unit 122 decides that the request information on power feed has been sent from the source equipment 110. The control unit 111 of the source equipment 110 forms an information transmitting unit, and the control unit 122 of the sink equipment 120 forms an information receiving unit. The same applies to the subsequent second to fifth control methods.

When feed of power from the sink equipment 120 becomes unnecessary, the source equipment 110 uses the line of the HDMI cable 130, which is coupled to the unused (reserved) pin, to transmit request information on power feed suspension. In this case, the control unit 111 of the source equipment 110 changes the voltage at the 14 pin of the HDMI terminal 116 from the high level to the low level, and thus transmits the request information on power feed suspension to the sink equipment 120. In this case, the control unit 122 of the sink equipment 120 monitors the voltage at the 14 pin of the HDMI terminal 121. When the voltage changes the level thereof from the high level to the low level, the control unit 122 decides that the request information on power feed suspension has been sent from the source equipment 110. At this time, the state of power feed in the source equipment 110 and sink equipment 120 is returned to the initial state.

Figure 6:
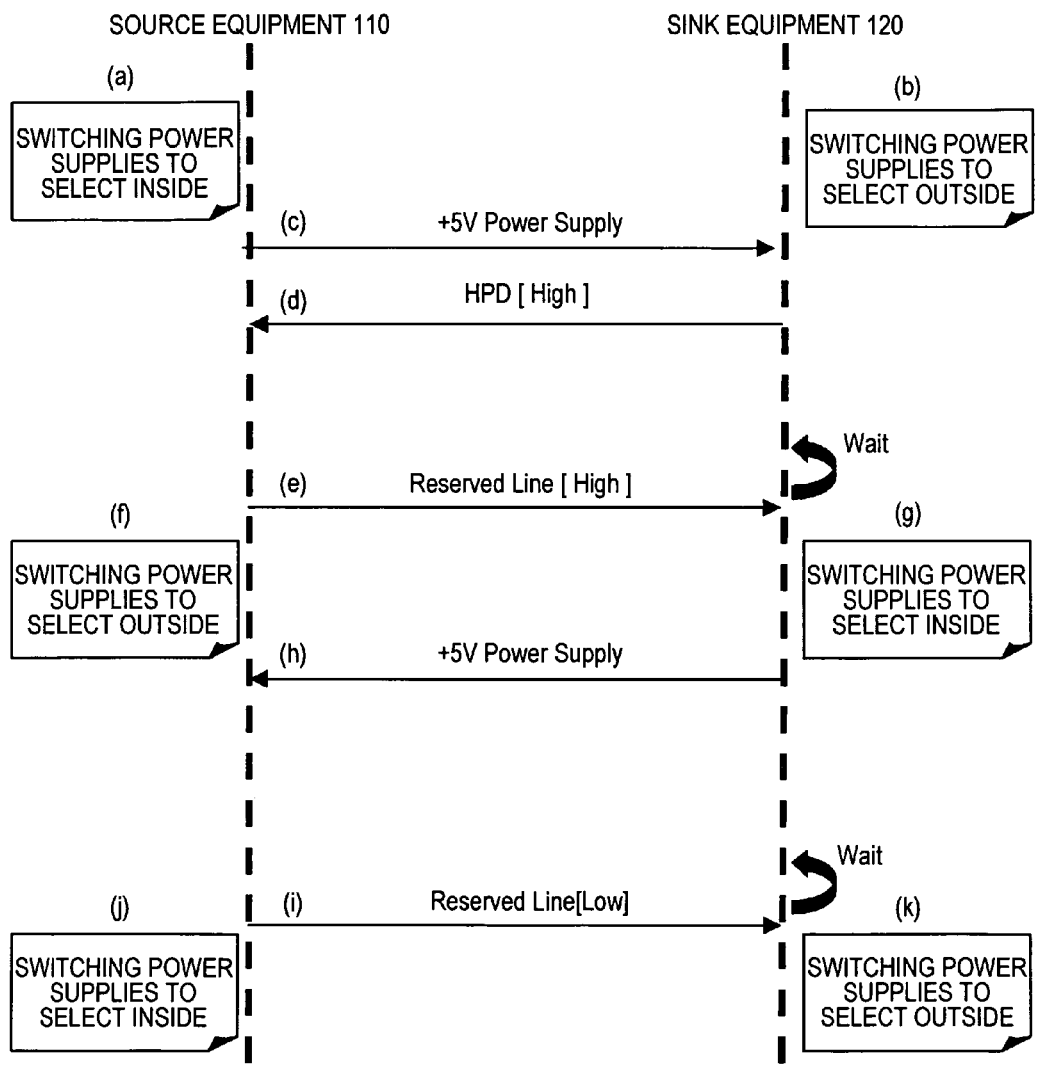
FIG. 6 is a diagram showing an example of a control sequence to be implemented in a case (first control method) where request information on power feed is transmitted from source equipment to sink equipment using a line included in an HDMI cable and coupled to an unused (reserved) pin.

FIG. 6 shows an example of a control sequence implemented in the first control method.

(a) The selection switches 115a and 115b of the switching circuit 115 of the source equipment 110 have the sides a thereof connected, and (b) the selection switches 127a and 127b of the switching circuit 127 of the sink equipment 120 have the sides b thereof connected. In this state, if the sink equipment 120 is connected to the source equipment 110 over the HDMI cable 130, (c) power of +5 V fed from the power circuit 114 of the source equipment 110 is fed to the internal circuits of the sink equipment 120 over the HDMI cable 130. Incidentally, to the internal circuits of the source equipment 110, the power of +5 V fed from the power circuit 114 of the source equipment 110 is fed.

(d) In this case, the voltage at the 19 pin (HPD) of the HDMI terminal 121 of the sink equipment 120 rises, and the voltage at the 19 pin (HPD) of the HDMI terminal 116 of the source equipment 110 rises accordingly. Therefore, the control unit 111 of the source equipment 110 recognizes that the sink equipment 120 has been connected.

(e) Thereafter, based on a user's manipulation or remaining battery capacity information on the battery forming the power circuit 114, the source equipment 110 changes the voltage at the 14 pin of the HDMI terminal 116 from the low level to the high level, and sends request information on power feed to the sink equipment 120. (f) Accordingly, the source equipment 110 has the sides b of the selection switches 115a and 115b of the switching circuit 115 connected, and (g) the sink equipment 120 has the sides a of the selection switches 127a and 127b of the switching circuit 127 connected.

(h) Eventually, power of +5 V fed from the power circuit 126 of the sink equipment 120 is fed to the internal circuits of the source equipment 110 over the HDMI cable 130. Incidentally, the power of +5 V fed from the power circuit 126 of the sink equipment 120 is fed to the internal circuits of the sink equipment 120. In this case, the battery forming the power circuit 114 of the source equipment 110 may be charged with the power of +5 V fed from the power circuit 126 of the sink equipment 120.

(i) Thereafter, based on a user's manipulation, the source equipment 110 changes the voltage at the 14 pin of the HDMI terminal 116 from the high level to the low level, and sends request information on power feed suspension to the sink equipment 120. (j) Accordingly, the source equipment 110 brings the selection switches 115a and 115b of the switching circuit 115 back to the state in which the sides a of the selection switches are connected, and (k) the sink equipment 120 brings the selection switches 127a and 127b of the switching circuit 127 back to the state in which the sides b of the selection switches are connected. Therefore, the state of power feed in the source equipment 110 and sink equipment 120 is returned to the initial state.

(2) Second control method

The source equipment 110 uses the power feed line of the HDMI cable 130 to transmit request information on power feed to the sink equipment 120. In this case, the control unit 111 of the source equipment 110 changes the voltage at the 18 pin of the HDMI terminal 116 from the high level to the low level, and thus sends the request information on power feed to the sink equipment 120. In this case, the control unit 122 of the sink equipment 120 monitors the voltage at the 18 pin of the HDMI terminal 121. When the voltage changes the level thereof from the high level to the low level, the control unit 122 decides that the request information on power feed has been sent from the source equipment 110.

The sink equipment 120 monitors a current value at the 18 pin of the HDMI terminal 121. When the current value changes the level thereof from the high level to the low level, the sink equipment 120 decides that request information on power feed suspension has been sent from the source equipment 110. At this time, the state of power feed in the source equipment 110 and sink equipment 120 is returned to the initial state.

Figure 7:
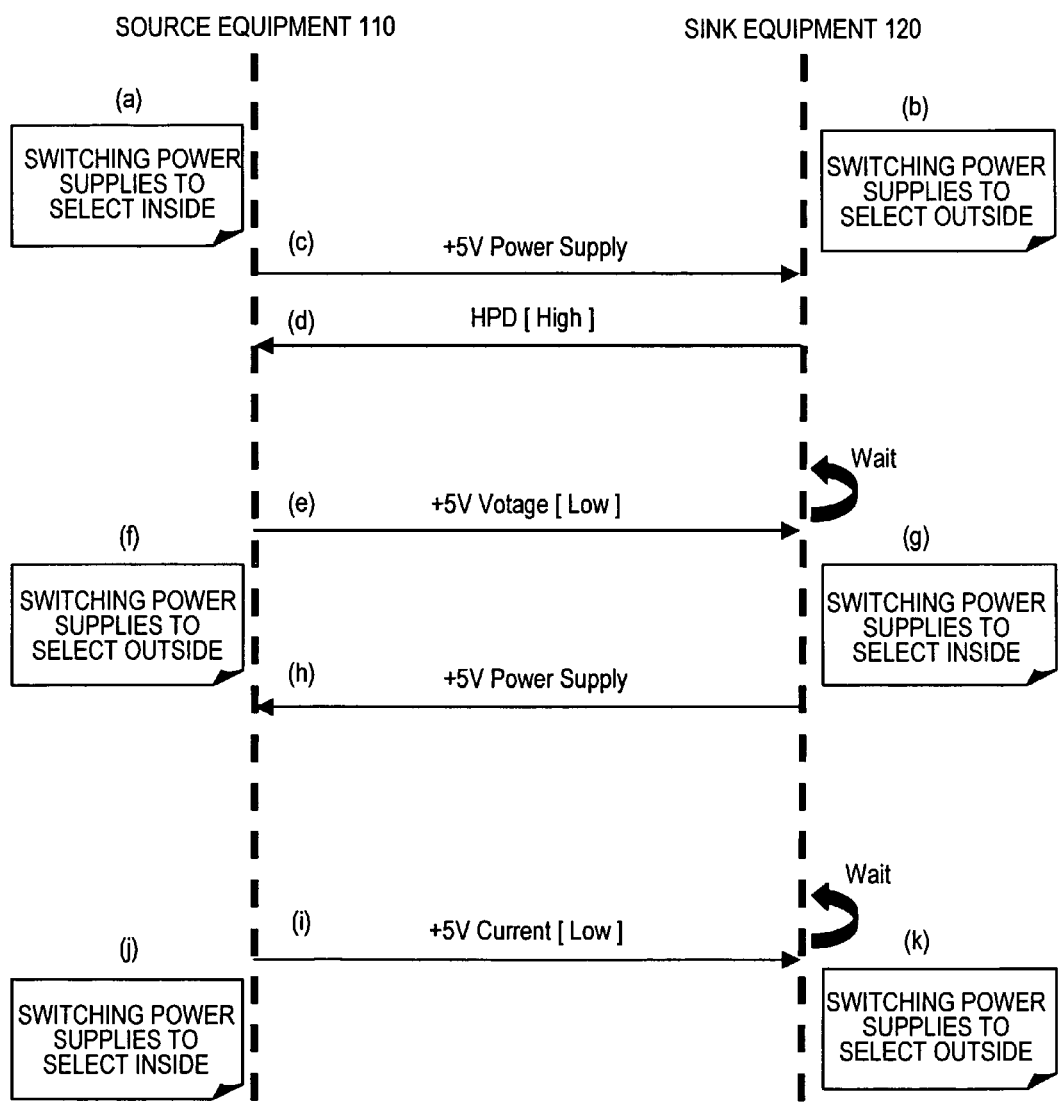
FIG. 7 is a diagram showing an example of a control sequence to be implemented in a case (second control method) where request information on power feed is transmitted from the source equipment to the sink equipment using a power feed line included in the HDMI cable.

FIG. 7 shows an example of a control sequence implemented in the second control method.

(a) The selection switches 115a and 115b of the switching circuit 115 of the source equipment 110 have the sides a thereof connected, and (b) the selection switches 127a and 127b of the switching circuit 127 of the sink equipment 120 have the sides b thereof connected. In this state, when the sink equipment 120 is connected to the source equipment 110 over the HDMI cable 130, (c) power of +5 V fed from the power circuit 114 of the source equipment 110 is fed to the internal circuits of the sink equipment 120 over the HDMI cable 130. Incidentally, to the internal circuits of the source equipment 110, the power of +5 V fed from the power circuit 114 of the source equipment 110 is fed.

(d) In this case, the voltage at the 19 pin (HPD) of the HDMI terminal 121 of the sink equipment 120 rises, and the voltage at the 19 pin (HPD) of the HDMI terminal 116 of the source equipment 110 rises accordingly. Therefore, the control unit 111 of the source equipment 110 recognizes that the sink equipment 120 has been connected.

(e) Thereafter, based on a user's manipulation or remaining battery capacity information on the battery forming the power circuit 114, the source equipment 110 changes the voltage at the 18 pin of the HDMI terminal 116 from the high level to the low level, and thus sends request information on power feed to the sink equipment 120. (f) Accordingly, the source equipment 110 enters a state in which the selection switches 115a and 115b of the switching circuit 115 thereof have the sides b thereof connected, and (g) the sink equipment 120 enters a state in which the selection switches 127a and 127b of the switching circuit 127 thereof have the sides a thereof connected.

(h) Eventually, power of +5 V fed from the power circuit 126 of the sink equipment 120 is fed to the internal circuits of the source equipment 110 over the HDMI cable 130. Incidentally, to the internal circuits of the sink equipment 120, the power of +5 V fed from the power circuit 126 of the sink equipment 120 is fed. In this case, the battery forming the power circuit 114 of the source equipment 110 may be charged with the power of +5 V fed from the power circuit 126 of the sink equipment 120.

(i) Thereafter, when power becomes unnecessary for the source equipment 110, the current values at the 18 pins of the HDMI terminals 116 and 121 respectively change the level thereof from the high level to the low level. Therefore, the sink equipment 120 decides that request information on power feed suspension has been sent from the source equipment 110, and the source equipment 110 decides that the request information on power feed suspension has been sent to the sink equipment 120.

(j) Accordingly, the source equipment 110 brings the selection switches 115a and 115b of the switching circuit 115 back to the state in which the sides a of the selection switches are connected, and (k) the sink equipment 120 brings the selection switches 127a and 127b of the switching circuit 127 back to the state in which the sides b of the selection switches are connected. Therefore, the state of power feed in the source equipment 110 and sink equipment 120 is returned to the initial state.

(3) Third Control Method

The source equipment 110 uses the CEC line of the HDMI cable 130 to transmit request information on power feed to the sink equipment 120. Specifically, the source equipment 110 transmits a power feed request to the sink equipment 120, and the sink equipment 120 sends a power feed response relevant to the request to the source equipment 110. The sink equipment 120 returns the power feed response, which contains availability information on each of a voltage value and a current value specified in the power feed request, to the source equipment 110. If power feed signified by the power feed request can be achieved, the sink equipment 120 enters a state in which power is fed to the source equipment 110.

When feed of power from the sink equipment 120 becomes unnecessary, the source equipment 110 uses the CEC line of the HDMI cable 130 to transmit request information on power feed suspension. Specifically, the source equipment 110 transmits a power feed request, which signifies that power feed is unnecessary (voltage value=0, current value=0), to the sink equipment 120. At this time, the state of power feed in the source equipment 110 and sink equipment 120 is returned to the initial state.

FIG. 8 shows control data structures of a power feed request <Request Power Supply> and a power feed response <Response Power Supply> which are CEC commands. Newly defined commands are the request for power feed and the response. In the request command, a supply voltage [Voltage] to be fed and a maximum current value [Max Current] can be specified as associated parameters.

In the example shown in FIG. 8, several supply voltages and maximum current values are specified while being classified. However, the supply voltages and maximum current values may be expressed while being free from the presented data format. In the response command, availability [V result] or [C result] may be specified as an associated parameter for each of the requested supply voltage and maximum current value.

Figure 9:
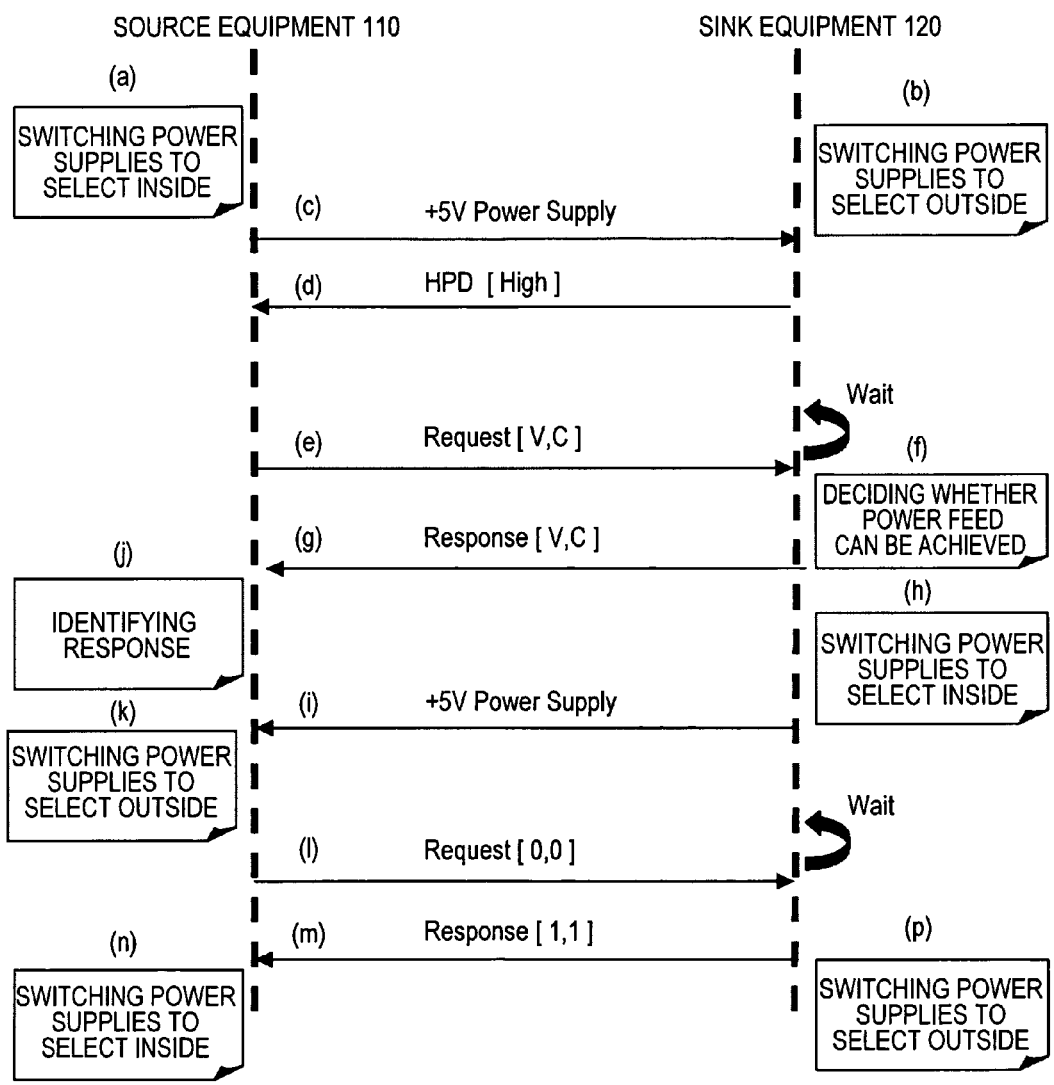
FIG. 9 is a diagram showing an example of a control sequence to be implemented in a case (third control method) where request information on power feed is transmitted from the source equipment to the sink equipment using a CEC line included in the HDMI cable.

FIG. 9 shows an example of a control sequence implemented in the third control method.

(a) The selection switches 115a and 115b of the switching circuit 115 of the source equipment 110 have the sides a thereof connected, and (b) the selection switches 127a and 127b of the switching circuit 127 of the sink equipment 120 have the sides b thereof connected. In this state, when the sink equipment 120 is connected to the source equipment 110 over the HDMI cable 130, (c) power of +5 V fed from the power circuit 114 of the source equipment 110 is fed to the internal circuits of the sink equipment 120 over the HDMI cable 130. Incidentally, to the internal circuits of the source equipment 110, the power of +5 V fed from the power circuit 114 of the source equipment 110 is fed.

(d) In this case, the voltage at the 19 pin (HPD) of the HDMI terminal 121 of the sink equipment 120 rises, and the voltage at the 19 pin (HPD) of the HDMI terminal 116 of the source equipment 110 rises accordingly. Therefore, the control unit 111 of the source equipment 110 recognizes that the sink equipment 120 has been connected.

(e) Thereafter, based on a user's manipulation or remaining battery capacity information on the battery forming the power circuit 114, the source equipment 110 transmits a command <Request Power Supply>, which is a power feed request, to the sink equipment 120 over the CEC line. (f) The sink equipment 120 decides whether feed of the voltage value and current value requested with the command <Request Power Supply> can be achieved, and (g) transmits the command <Request Power Supply>, which is a power feed response containing the result of the decision, to the source equipment 110 over the CEC line.

(h) If feed of the requested voltage value and current value can be achieved, the sink equipment 120 controls power fed from the power circuit 126 so that the voltage value and current value of the power will correspond to the voltage value and current value requested by the source equipment 110, and brings the selection switches 127a and 127b of the switching circuit 127 to the state in which the sides a of the selection switches are connected. (i) Eventually, the power sent from the power circuit 126 of the sink equipment 120 is fed to the source equipment 110 over the HDMI cable 130.

(j) The source equipment 110 identifies the command <Response Power Supply> sent from the sink equipment 120. (k) If the command is a response signifying that feed can be achieved, the source equipment 110 brings the selection switches 115a and 115b of the switching circuit 115 to the state in which the sides b of the selection switches are connected. Eventually, the power sent from the sink equipment 120 is fed to the internal circuits of the source equipment 110.

(l) Thereafter, if power becomes unnecessary for the source equipment 110, the source equipment 110 transmits the command <Request Power Supply>, which signifies that power feed is unnecessary, to the sink equipment 120. (m) The sink equipment 120 detects the command <Request Power Supply>, and returns the command <Response Power Supply> to the source equipment 110. (n) Accordingly, the source equipment 110 brings the selection switches 115a and 115b of the switching circuit 115 back to the state in which the sides a of the selection switches are connected, and (p) the sink equipment 120 brings the selection switches 127a and 127b of the switching circuit 127 to the state in which the sides b of the selection switches are connected. Eventually, the state of power feed in the source equipment 110 and sink equipment 120 is returned to the initial state.

(4) Fourth Control Method

The source equipment 110 uses a high-speed bidirectional communication means to transmit request information on power feed to the sink equipment 120. The high-speed bidirectional communication means shall be formed using a pair of differential lines of the HDMI cable 130, for example, a line coupled to the unused (reserved) pin (14 pin) (hereinafter, referred to as a reserved line) and a line coupled to the HPD pin (19 pin) (hereinafter, referred to as an HPD line).

Figure 10:
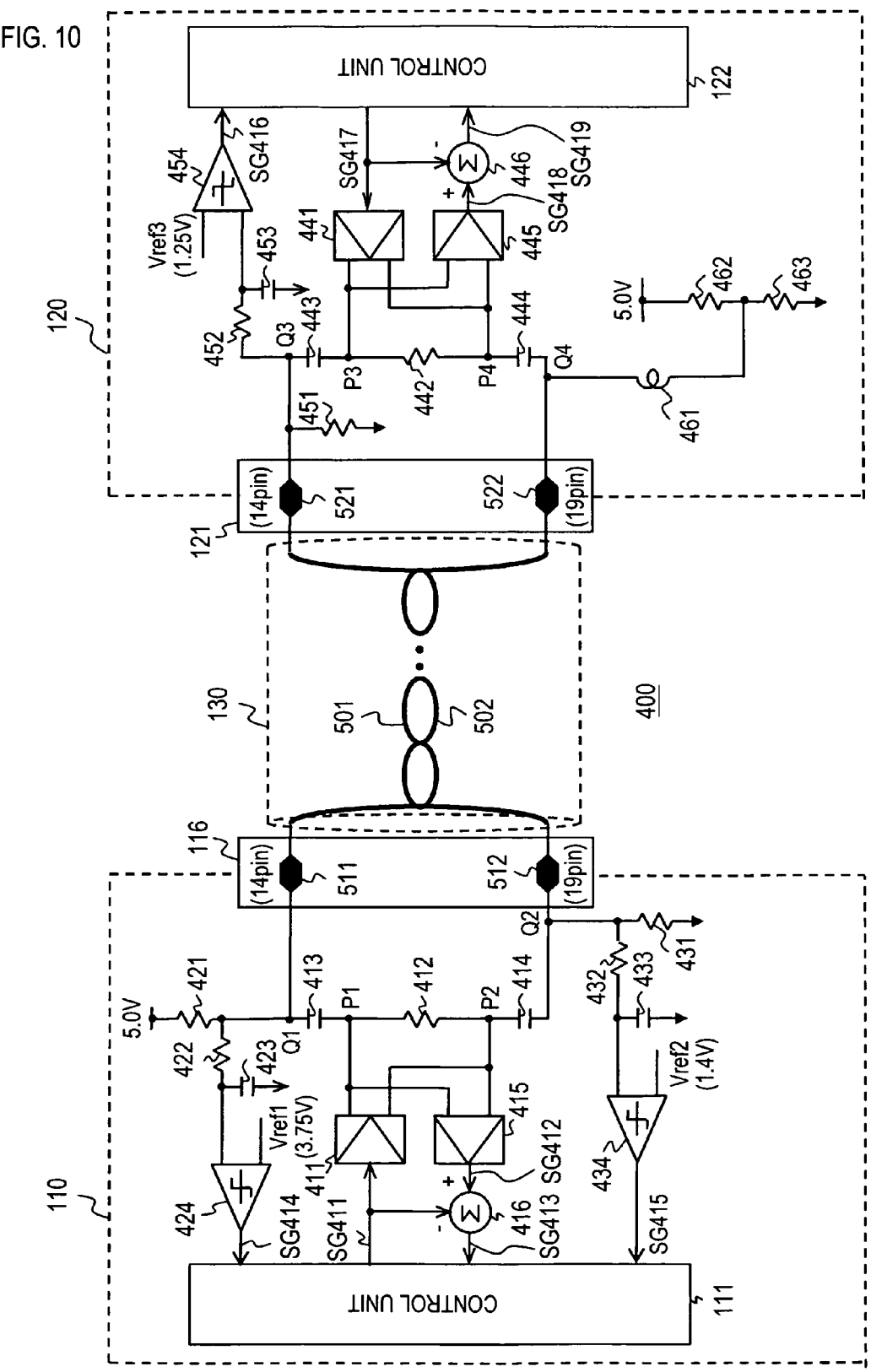
FIG. 10 is a connection diagram showing an example of the configuration of a high-speed bidirectional communication means for LAN communication between the source equipment and sink equipment.

Referring to FIG. 10, a high-speed bidirectional communication means 400 for local area network (LAN) communication will be described below. In FIG. 10, the same reference numerals are assigned to components identical to those shown in FIG. 1. Noted is that a section relevant to the high-speed bidirectional communication means 400 is not shown in FIG. 1.

The source equipment 110 includes a LAN signal transmitting circuit 411, a terminal resistor 412, AC-coupled capacitors 413 and 414, a LAN signal receiving circuit 415, a subtraction circuit 416, a pull-up resistor 421, a resistor 422 and a capacitor 423 constituting a low-pass filter, a comparator 424, a pull-down resistor 431, a resistor 432 and a capacitor 433 constituting a low-pass filter, and a comparator 434.

A series circuit composed of the pull-up resistor 421, AC-coupled capacitor 413, terminal resistor 412, AC-coupled capacitor 414, and pull-down resistor 431 is connected between a power line (+5.0 V) and a ground line. A junction point P1 between the AC-coupled capacitor 413 and terminal resistor 412 is connected to a positive output side of the LAN signal transmitting circuit 411, and also connected to a positive input side of the LAN signal receiving circuit 415. A junction point P2 between the AC-coupled capacitor 414 and terminal resistor 412 is connected to a negative output side of the LAN signal transmitting circuit 411, and also connected to a negative input side of the LAN signal receiving circuit 415. A transmission signal SG411 is fed from the control unit 111 to the input side of the LAN signal transmitting circuit 411.

An output signal SG412 of the LAN signal receiving circuit 415 is fed to the positive terminal of the subtraction circuit 416, and the transmission signal SG411 is fed from the control unit 111 to the negative terminal of the subtraction circuit 416. In the subtraction circuit 416, the transmission signal SG411 is subtracted from the output signal SG412 of the LAN signal receiving circuit 415. The output signal SG413 of the subtraction circuit 416 is fed to the control unit 111.

A junction point Q1 between the pull-up resistor 421 and AC-coupled capacitor 413 is connected to the ground line via a series circuit composed of the resistor 422 and capacitor 423. The output signal of the low-pass filter developed at the junction point between the resistor 422 and capacitor 423 is fed to one of the input terminals of the comparator 424. In the comparator 424, the output signal of the low-pass filter is compared with a reference voltage Vref1 (+3.75 V) fed to the other input terminal. The output signal SG414 of the comparator 424 is fed to the control unit 111.

A junction point Q2 between the AC-coupled capacitor 414 and pull-down resistor 431 is connected to the ground line via the series circuit composed of the resistor 432 and capacitor 433. The output signal of the low-pass filter developed at the junction point between the resistor 432 and capacitor 433 is fed to one of the input terminals of the comparator 434. In the comparator 434, the output signal of the low-pass filter is compared with a reference voltage Vref2 (+1.4 V) fed to the other input terminal. The output signal SG415 of the comparator 434 is fed to the control unit 111.

The sink equipment 402 includes a LAN signal transmitting circuit 441, a terminal resistor 442, AC-coupled capacitors 443 and 444, a LAN signal receiving circuit 445, a subtraction circuit 446, a pull-down resistor 451, a resister 452 and a capacitor 453 constituting a low-pass filter, a comparator 454, a choke coil 461, a resistor 462, and a resistor 463.

A series circuit composed of the resistor 462 and resistor 463 is connected between the power line (+5.0 V) and ground line. A series circuit composed of the choke coil 461, AC-coupled capacitor 444, terminal resistor 442, AC-coupled capacitor 443, and pull-down resistor 451 is connected between the junction point between the resistor 462 and resistor 463 and the ground line.

A junction point P3 between the AC-coupled capacitor 443 and terminal resistor 442 is connected to the positive output side of the LAN signal transmitting circuit 441, and also connected to the positive input side of the LAN signal receiving circuit 445. A junction point P4 between the AC-coupled capacitor 444 and terminal resistor 442 is connected to the negative output side of the LAN signal transmitting circuit 441, and also connected to the negative input side of the LAN signal receiving circuit 445. A transmission signal SG417 is fed from the control unit 122 to the input side of the LAN signal transmitting circuit 441.

An output signal SG418 of the LAN signal receiving circuit 445 is fed to the positive terminal of the subtraction circuit 446, and the transmission signal SG417 is fed from the control unit 122 to the negative terminal of the subtraction circuit 446. In the subtraction circuit 446, the transmission signal SG417 is subtracted from the output signal SG418 of the LAN signal receiving circuit 445. The output signal SG419 of the subtraction circuit 446 is fed to the control unit 122.

A junction point Q3 between the pull-down resistor 451 and AC-coupled capacitor 443 is connected to the ground line via a series circuit composed of the resistor 452 and capacitor 453. The output signal of the low-pass filter developed at the junction point between the resistor 452 and capacitor 453 is fed to one of the input terminals of the comparator 454. In the comparator 454, the output signal of the low-pass filter is compared with a reference voltage Vref3 (+1.25 V) fed to the other input terminal. The output signal SG416 of the comparator 454 is fed to the control unit 122.

A reserved line 501 and an HPD line 502 included in the HDMI cable 130 form a differential twisted pair. A source-side end 511 of the reserved line 501 is coupled to the 14 pin of the HDMI terminal 116, and a sink-side end 521 of the reserved line 501 is coupled to the 14 pin of the HDMI terminal 121. A source-side end 512 of the HPD line 502 is coupled to the 19 pin of the HDMI terminal 116, and a sink-side end 522 of the HPD line 502 is coupled to the 19 pin of the HDMI terminal 121.

In the source equipment 110, the junction point. Q1 between the pull-up resistor 421 and AC-coupled capacitor 413 is connected to the 14 pin of the HDMI terminal 116. The junction point Q2 between the pull-down resistor 431 and AC-coupled capacitor 414 is connected to the 19 pin of the HDMI terminal 116. In the sink equipment 120, the junction point Q3 between the pull-down resistor 451 and AC-coupled capacitor 443 is connected to the 14 pin of the HDMI terminal 121. The junction point Q4 between the choke coil 461 and AC-coupled capacitor 444 is connected to the 19 pin of the HDMI terminal 121.

The action for LAN communication of the high-speed bidirectional communication means 400 shown in FIG. 10 will be described below.

In the source equipment 110, the transmission signal SG411 outputted from the control unit 111 is fed to the input side of the LAN signal transmitting circuit 411, and differential signals (positive output signal and negative output signal) consistent with the transmission signal SG411 are outputted from the LAN signal transmitting circuit 411. The differential signals outputted from the LAN signal transmitting circuit 411 are fed to the junction points P1 and P2, and transmitted to the sink equipment 120 over the pair of lines (reserved line 501 and HPD line 502) of the HDMI cable 130.

In the sink equipment 120, the transmission signal SG417 outputted from the control unit 122 is fed to the input side of the LAN signal transmitting circuit 441, and differential signals (positive output signal and negative output signal) consistent with the transmission signal SG417 are outputted from the LAN signal transmitting circuit 441. The differential signals outputted from the LAN signal transmitting circuit 441 are fed to the junction points P3 and P4, and transmitted to the source equipment 110 over the pair of lines (reserved line 501 and HPD line 502) of the HDMI cable 130.

In the source equipment 110, the input side of the LAN signal receiving circuit 415 is connected to the junction points P1 and P2. Therefore, a sum signal between a transmission signal consistent with the differential signals (current signals) outputted from the LAN signal transmitting circuit 411 and a received signal consistent with the differential signals sent from the sink equipment 120 as mentioned above is obtained as the output signal SG412 of the LAN signal receiving circuit 415. In the subtraction circuit 416, the transmission signal SG411 is subtracted from the output signal SG412 of the LAN signal receiving circuit 415. Therefore, the output signal SG413 of the subtraction circuit 416 is consistent with the transmission signal SG417 of the sink equipment 120.

In the sink equipment 120, the input side of the LAN signal receiving circuit 445 is connected to the junction points P3 and P4. Therefore, a sum signal between a transmission signal consistent with the differential signals (current signals) outputted from the LAN signal transmitting circuit 441 and a received signal consistent with the differential signals sent from the source equipment 110 as mentioned above is obtained as the output signal SG418 of the LAN signal receiving circuit 445. In the subtraction circuit 446, the transmission signal SG417 is subtracted from the output signal SG418 of the LAN signal receiving circuit 445. Therefore, the output signal SG419 of the subtraction circuit 446 is consistent with the transmission signal SG411 of the source equipment 110.

As mentioned above, in the high-speed bidirectional communication means 400 shown in FIG. 10, bidirectional LAN communication can be performed between the source equipment 110 and sink equipment 120.

In the high-speed bidirectional communication means 400 shown in FIG. 10, the HPD line 502 is not only used for LAN communication but also used to inform at a DC bias level the source equipment 110 of the fact that the HDMI cable 130 is plugged into the sink equipment 120.

Specifically, when the HDMI cable 130 is plugged into the sink equipment 120, the resistors 462 and 463 and choke coil 461 included in the sink equipment 120 bias the HPD line 502 at approximately 4 V through the 19 pin of the HDMI terminal 121.

The source equipment 110 uses the low-pass filter, which is composed of the resistor 432 and capacitor 433, to sample the DC bias on the HPD line 502, and uses the comparator 434 to compare the DC bias with the reference voltage Vref2 (for example, 1.4 V).

As long as the HDMI cable 130 is not plugged into the sink equipment 120, the voltage at the 19 pin of the HDMI terminal 116 is lower than the reference voltage Vref2 because of the presence of the pull-down resistor 431. In contrast, if the HDMI cable 130 is plugged into the sink equipment 120, the voltage is higher than the reference voltage Vref2. Therefore, when the HDMI cable 130 is plugged into the sink equipment 120, the output signal SG415 of the comparator 434 takes on a high level. Otherwise, the output signal takes on a low level. Therefore, based on the output signal SG415 of the comparator 434, the control unit 111 of the source equipment 110 recognizes whether the HDMI cable 130 has been plugged into the sink equipment 120.

In the high-speed bidirectional communication means 400 shown in FIG. 10, the DC bias potential on the reserved line 501 allows pieces of equipment, which are connected to each other at both ends of the HDMI cable 130, to mutually recognize whether the remote equipment can achieve LAN communication (hereinafter, referred to as e-HDMI compatible equipment) or cannot achieve LAN communication (hereinafter, referred to as e-HDMI incompatible equipment).

As mentioned above, the source equipment 110 pulls up (+5 V) the reserved line 501 using the resistor 421, and the sink equipment 120 pulls down the reserved line 501 using the resistor 451. The resistors 421 and 451 do not exist in e-HDMI incompatible equipment.

The source equipment 110 uses, as mentioned above, the comparator 424 to compare the DC potential on the reserved line 501, which is caused by a current having passed through the low-pass filter composed of the resistor 422 and capacitor 423, with the reference voltage Vref1. When the sink equipment 120 is e-HDMI compatible equipment and includes the pull-down resistor 451, the voltage on the reserved line 501 is 2.5 V. However, when the sink equipment 120 is e-HDMI incompatible equipment and does not have the pull-down resistor 451, the voltage on the reserved line 501 is 5 V due to the presence of the pull-up resistor 421.

Therefore, when the reference voltage Vref1 is, for example, 3.75 V, if the sink equipment 120 is e-HDMI compatible equipment, the output signal SG414 of the comparator 424 takes on the low level. Otherwise, the output signal SG414 takes on the high level. Therefore, the control unit 111 of the source equipment 110 recognizes based on the output signal SG414 of the comparator 424 whether the sink equipment 120 is e-HDMI compatible equipment.

Likewise, the sink equipment 120 uses, as mentioned above, the comparator 454 to compare a DC potential on the reserved line 501, which is caused by a current having passed through the low-pass filter composed of the resistor 452 and capacitor 453, with the reference voltage Vref3. When the source equipment 110 is e-HDMI compatible equipment and has the pull-up resistor 421, the voltage on the reserved line 501 is 2.5 V. However, when the source equipment 110 is e-HDMI incompatible equipment and does not have the pull-up resistor 421, the voltage on the reserved line 501 is 0 V because of the presence of the pull-down resistor 451.

Therefore, when the reference voltage Vref3 is set to, for example, 1.25 V, if the source equipment 110 is e-HDMI compatible equipment, the output signal SG416 of the comparator 454 takes on the high level. Otherwise, the output signal takes on the low level. Therefore, the control unit 122 of the sink equipment 120 recognizes based on the output signal SG416 of the comparator 454 whether the source equipment 110 is e-HDMI compatible equipment.

Incidentally, the pull-up resistor 421 shown in FIG. 10 may be included in the HDMI cable 130 but may not be included in the source equipment 110. In this case, the terminals of the pull-up resistors 421 are coupled to the reserved line 501 and a line (signal line) linked to a power supply (supply potential) out of the lines constituting the HDMI cable 130.

Further, the pull-down resistor 451 and resistor 463 shown in FIG. 10 may be included in the HDMI cable 130 but may not be included in the sink equipment 120. In this case, the terminals of the pull-down resistor 451 are coupled to the reserved line 501 and a line (ground line) linked to a ground (reference potential) out of the lines constituting the HDMI cable 130. The terminals of the resistor 463 are coupled to the HPD line 502 and the line (ground line) linked to the ground (reference potential) out of the lines constituting the HDMI cable 130.

The precondition for the fourth control method is such that a high-speed bidirectional communication means identical to or similar to the high-speed bidirectional communication means 400 should be formed in the source equipment 110 and sink equipment 120. The source equipment 110 uses the high-speed bidirectional communication means to transmit request information on power feed to the sink equipment 120. Specifically, the source equipment 110 transmits a power feed request to the sink equipment 120. The sink equipment 120 sends a power feed response relevant to the request to the source equipment 110. The sink equipment 120 returns the power feed response, which contains availability information on each of a voltage value and a current value specified in the power feed request, to the source equipment 110. When power feed signified by the power feed request can be achieved, the sink equipment 120 enters a state in which power is fed to the source equipment 110.

When feed of power from the sink equipment 120 becomes unnecessary, the source equipment 110 uses the high-speed bidirectional communication means to transmit request information on power feed suspension. Specifically, the source equipment 110 transmits a power feed request, which signifies that power feed is unnecessary (voltage value=0, current value=0), to the sink equipment 120. At this time, the state of power feed in the source equipment 110 and sink equipment 120 is returned to the initial state.

Figure 11:
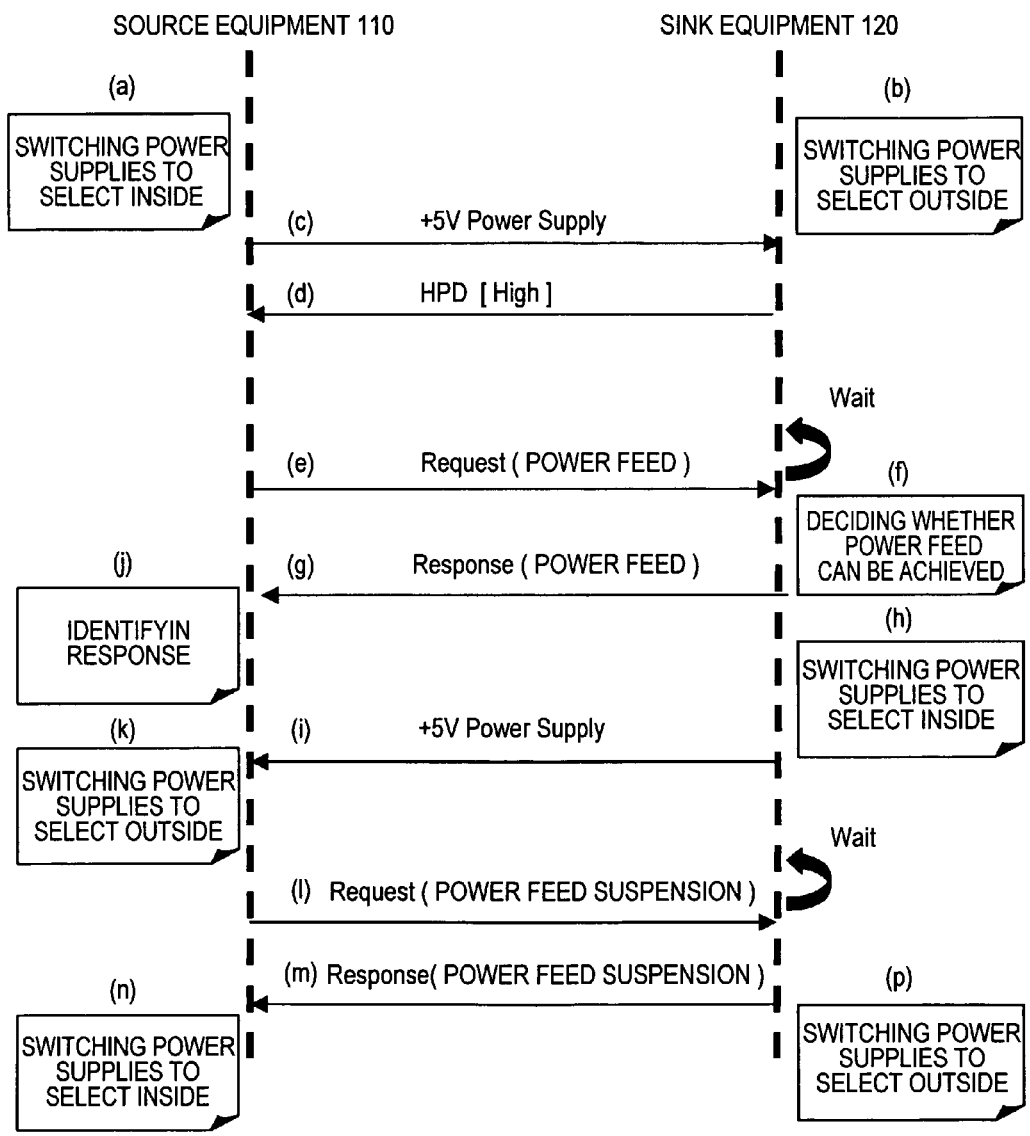
FIG. 11 is a diagram showing an example of a control sequence to be implemented in a case (fourth control method) where request information on power feed is transmitted from the source equipment to the sink equipment using the high-speed bidirectional communication means.

FIG. 11 shows an example of a control sequence implemented in the fourth control method.

(a) The selection switches 115a and 115b of the switching circuit 115 of the source equipment 110 have the sides a thereof connected, and (b) the selection switches 127a and 127b of the switching circuit 127 of the sink equipment 120 have the sides b thereof connected. In this state, when the sink equipment 120 is connected to the source equipment 110 over the HDMI cable 130, (c) power of +5 V fed from the power circuit 114 of the source equipment 110 is fed to the internal circuits of the sink equipment 120 over the HDMI cable 130. Incidentally, to the internal circuits of the source equipment 110, the power of +5 V fed from the power circuit 114 of the source equipment 110 is fed.

(d) In this case, the voltage at the 19 pin (HPD) of the HDMI terminal 121 of the sink equipment 120 rises, and the voltage at the 19 pin (HPD) of the HDMI terminal 116 of the source equipment 110 rises accordingly. Therefore, the control unit 111 of the source equipment 110 recognizes that the sink equipment 120 has been connected.

(e) Thereafter, based on a user's manipulation or remaining battery capacity information on the battery forming the power circuit 114, the source equipment 110 transmits a request for power feed (including pieces of information on a requested voltage value and current value respectively similarly to the aforesaid command <Request Power Supply> to be transmitted over the CEC line) to the sink equipment 120 by way of the high-speed bidirectional communication means. (f) The sink equipment 120 decides whether feed of the voltage value and current value requested with the request can be achieved, and (g) transmits a response, which contains the result of the decision, to the source equipment 110 by way of the high-speed bidirectional communication means.

(h) When feed of the requested voltage value and current value can be achieved, the sink equipment 120 controls power fed from the power circuit 126 so that the voltage value and current value of the power will correspond to the voltage value and current value requested by the source equipment 110, and brings the selection switches 127a and 127b of the switching circuit 127 to the state in which the sides a of the selection switches are connected. (i) Eventually, the power fed from the power circuit 126 of the sink equipment 120 is fed to the source equipment 110 over the HDMI cable 130.

(j) The source equipment 110 identifies the power feed response sent from the sink equipment 120. (k) If the response signifies that feed can be achieved, the source equipment 110 brings the selection switches 115a and 115b of the switching circuit 115 to the state in which the sides b of the selection switches are connected. Eventually, the power fed from the sink equipment 120 is fed to the internal circuits of the source equipment 110.

(l) Thereafter, when power becomes unnecessary for the source equipment 110, the source equipment 110 transmits a request, which requests power feed suspension, to the sink equipment 120. (m) The sink equipment 120 detects the power feed suspension request, and returns a response to the source equipment 110. (n) Accordingly, the source equipment 110 brings the selection switches 115a and 115b of the switching circuit 115 back to the state in which the sides a of the selection switches are connected, and (p) the sink equipment 120 brings the selection switches 127a and 127b of the switching circuit 127 back to the state in which the sides b of the selection switches are connected. Eventually, the state of power feed in the source equipment 110 and sink equipment 120 is returned to the initial state.

(5) Fifth Control Method

The source equipment 110 inserts request information into the blanking period of a video signal to be transmitted on the TMDS channel conformable to the HDMI, and transmits the request information to the sink equipment 120. For example, source product description (SPD) InfoFrame conformable to the HDMI is conceivably used to insert the request information into the blanking period of the video signal to be transmitted on the TMDS channel.

In this case, the control unit 111 of the source equipment 110 describes a specific vendor name, for example, ABCD in a vendor name field (Vendorname Character field) in the SPD InfoFrame. The control unit 122 of the sink equipment 120 monitors the vendor name field of the SPD InfoFrame. If the specific vendor name is described, the control unit 122 decides that request information on power feed has been sent from the source equipment 110. Incidentally, the specific vendor name is not limited to a certain vendor name but may be any of multiple vendor names.

FIG. 12 shows the configuration of the SPD InfoFrame. For example, Data Byte 1 to Data Byte 8 shall constitute the Vendorname Character field (vendor name field). The field is used to store vendor name information. Data Byte 9 to Data Byte 24 shall constitute a Product Descript Character field (model number field). Data Byte 25 shall serve as a Source Device Information field (source equipment type field). In the source equipment type field, as shown in FIG. 13, codes representing source equipment types are stored.

Figures 13, 14:
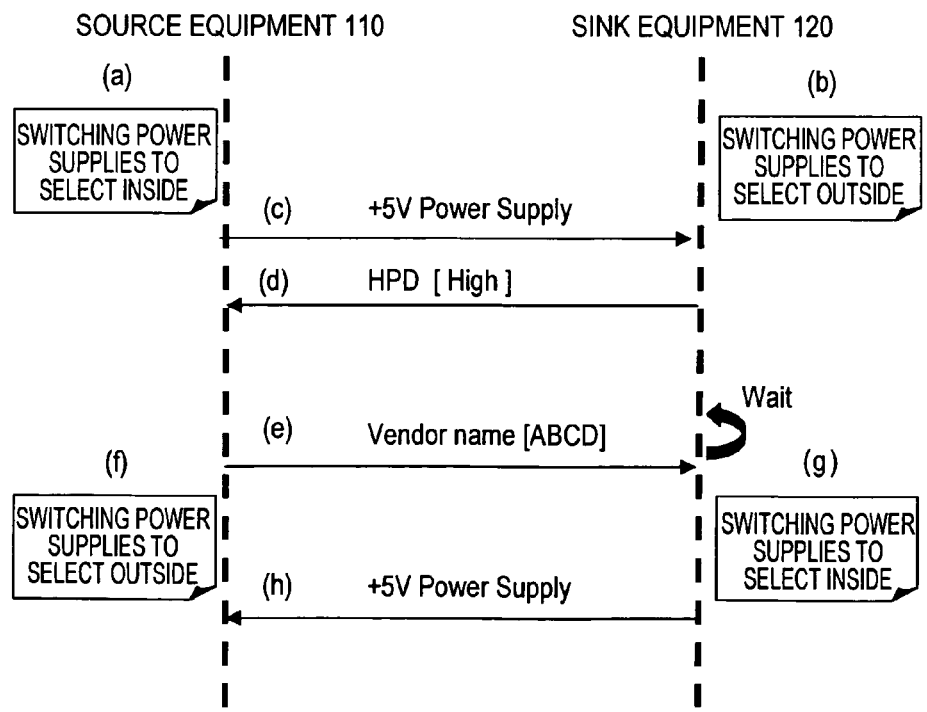
FIG. 13 is a diagram showing the configuration of Source Device Information.
FIG. 14 is a diagram showing an example of a control sequence to be implemented in a case (fifth control method) where request information on power feed is transmitted using SPD InfoFrame.

FIG. 14 shows an example of a control sequence implemented in the fifth control method.

(a) The selection switches 115a and 115b of the switching circuit 115 of the source equipment 110 have the sides a thereof connected, and (b) the selection switches 127a and 127b of the switching circuit 127 of the sink equipment 120 have the sides b thereof connected. In this state, when the sink equipment 120 is connected to the source equipment 110 over the HDMI cable 130, (c) power of +5 V fed from the power circuit 114 of the source equipment 110 is fed to the internal circuits of the sink equipment 120 over the HDMI cable 130. Incidentally, to the internal circuits of the source equipment 110, the power of +5 V fed from the power circuit 114 of the source equipment 110 is fed.

(d) In this case, the voltage at the 19 pin (HPD) of the HDMI terminal 121 of the sink equipment 120 rises, and the voltage at the 19 pin (HPD) of the HDMI terminal 116 of the source equipment 110 rises accordingly. Therefore, the control unit 111 of the source equipment 110 recognizes that the sink equipment 120 has been connected.

(e) Thereafter, a video signal having SPD InfoFrame, which has a specific vendor name, for example, ABCD described in the vendor name field thereof, inserted into the blanking period thereof is fed from the source equipment 110 to the sink equipment 120 on the TMDS channel conformable to the HDMI. This means that request information on power feed has been sent from the source equipment 110 to the sink equipment 120. Herein, the specific vendor name is described in the vendor name field according to the setting or a user's manipulation. (f) Accordingly, the source equipment 110 enters the state in which the selection switches 115a and 115b of the switching circuit 115 thereof have the sides b thereof connected, and (g) the sink equipment 120 enters the state in which the selection switches 127a and 127b of the switching circuit 127 thereof have the sides a thereof connected.

(h) Accordingly, power of +5 V fed from the power circuit 126 of the sink equipment 120 is fed to the internal circuits of the source equipment 110 over the HDMI cable 130. Incidentally, to the internal circuits of the sink equipment 120, the power of +5 V fed from the power circuit 126 of the sink equipment 120 is fed.

As mentioned above, when the specific vendor name is described in the vendor name field of SPD InfoFrame, if power is fed from the sink equipment 120 to the source equipment 110, as long as the source equipment 110 of a specific maker is connected to the sink equipment 120, power is fed from the sink equipment 120 to the source equipment 110.

As described previously, in the communication system 100 shown in FIG. 1, the sink equipment 120 feeds power to the source equipment 110 in response to a request for power feed sent from the source equipment 110. Therefore, the power circuit 114 of the source equipment 110 can be formed with, for example, a battery circuit alone, but does not require an AC adaptor or the like. The power circuit 114 can be simplified. For example, a power circuit of mobile equipment (source equipment) such as a digital camera recorder or a digital still camera that is connected to sink equipment having a satisfactory power circuit such as a television set can be simplified and can be made compact and inexpensive.

In the communication system 100 shown in FIG. 1, pieces of information on a requested voltage value and current value may be contained in a request for power feed to be transmitted from the source equipment 110 to the sink equipment 120 (third control method or fourth control method). The source equipment 110 may receive feed of power of the necessary voltage value or current value from the sink equipment 20. In this case, if the source equipment 110 is mobile equipment that needs power of other than 5 V, the sink equipment 120 feeds optimal power to the mobile equipment.

Figure 15:
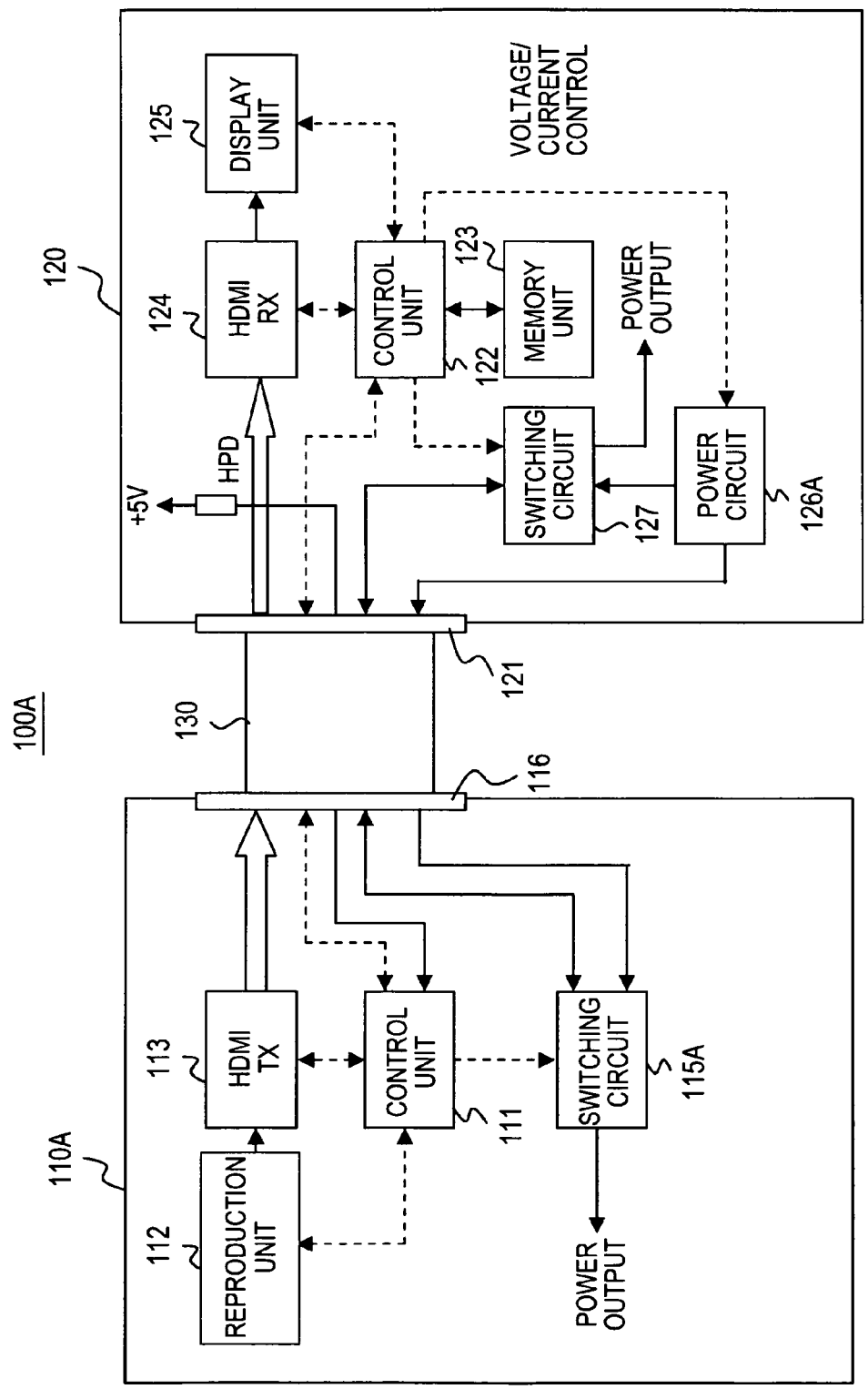
FIG. 15 is a block diagram showing an example of the configuration of a communication system, which employs an HDMI interface, in accordance with another embodiment of the present invention.

Next, another embodiment of the present invention will be described below. FIG. 15 shows an example of the configuration of a communication system 100A of another embodiment. In FIG. 15, the same reference numerals are assigned to components identical to those shown in FIG. 1. An iterative description will be omitted.

The communication system 100A includes source equipment 110A and sink equipment 120A. The source equipment 110A and sink equipment 120A are connected to each other over the HDMI cable 130. For example, the source equipment 110A is reproduction equipment that does not include a power circuit, and the sink equipment 120 is a television set having a satisfactory power circuit.

The source equipment 110A includes a control unit 111, a reproduction unit 112, an HDMI transmitting unit (HDMI source) 113, a switching circuit 115A, and an HDMI terminal 116. The switching circuit 115A feeds power, which is fed from the sink equipment 120A over a reserved line of the HDMI cable 130, to the internal circuits. The switching circuit 115A selectively feeds power, which is fed over a power line of the HDMI cable 130, to the sink equipment 120A over the power line of the HDMI cable 130. Further, the switching circuit 115A selectively feeds power, which is fed from the sink equipment 120A over the power line of the HDMI cable 130, to the internal circuits. The switching circuit 115A forms a power feeding unit and a power supply switching unit. The switching circuit 115A will be detailed later. The other components of the source equipment 110A are identical to those of the source equipment 110 shown in FIG. 1, though a description will be omitted.

The sink equipment 120A includes an HDMI terminal 121, a control unit 122, a memory unit 123, an HDMI receiving unit (HDMI sink) 124, a display unit 125, a power circuit 126A, and a switching circuit 127.

The power circuit 126A generates power to be fed to the internal circuits of the sink equipment 120A and to the source equipment 110A. The power circuit 126A is a satisfactory power circuit that generates power (DC power) from AC power. The power circuit 126A feeds the power to the source equipment 110A over the reserved line of the HDMI cable 130. The power circuit 126A selectively feeds power to the source equipment 110A over the power line of the HDMI cable 130 via the switching circuit 127. The other components of the sink equipment 120A are identical to those of the sink equipment 120 shown in FIG. 1, though a description thereof will be omitted.

Figure 16:
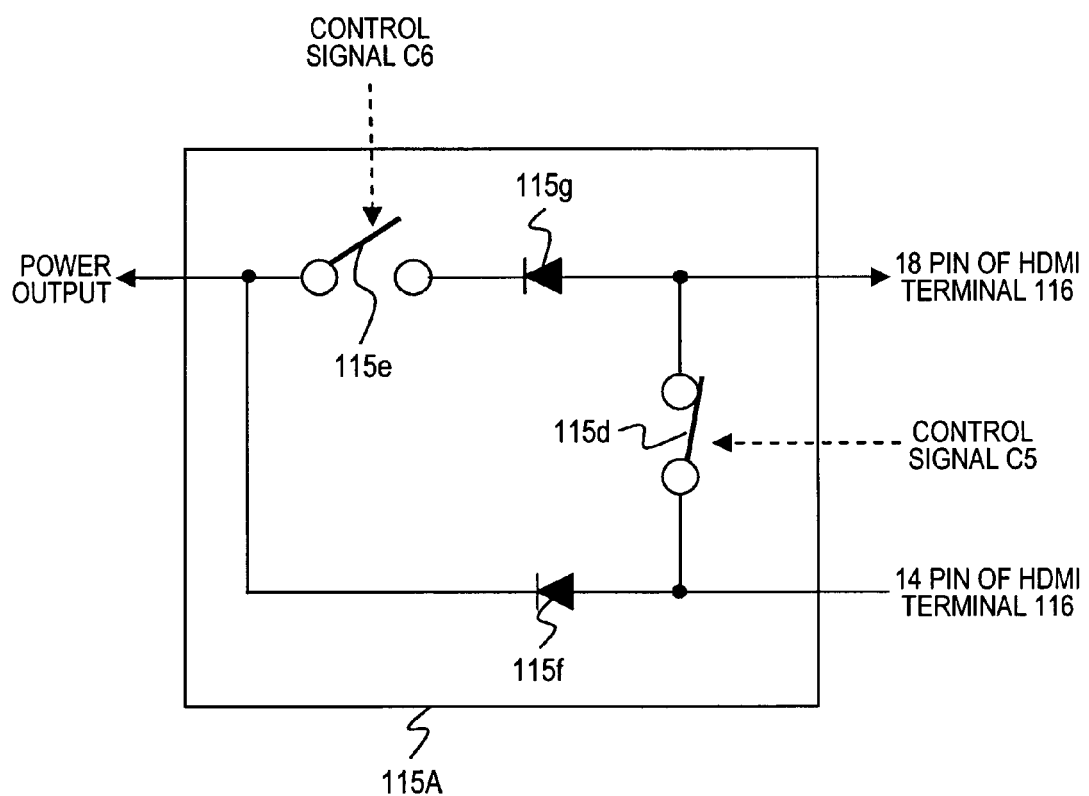
FIG. 16 is a diagram showing an example of the configuration of a switching circuit that switches power supplies included in the source equipment.

FIG. 16 shows an example of the configuration of the switching circuit 115A of the source equipment 110A. The switching circuit 115A includes two connection switches 115d and 115e and diodes 115f and 115g. The 14 pin of the HDMI terminal 116 to which the reserved line of the HDMI cable 130 is coupled is connected to the 18 pin of the HDMI terminal 116, to which the power line of the HDMI cable 130 is coupled, via the connection switch 115d. A junction point between the 14 pin of the HDMI terminal 116 and the connection switch 115d is connected to the internal circuits via the anode and cathode of the diode 115f. A junction point between the 18 pin of the HDMI terminal 116 and the connection switch 115d is connected to the internal circuits via the anode and cathode of the diode 115g and the connection switch 115e.

The on and off states of the connection switch 115d are controlled with a control signal C5 fed from the control unit 111. Likewise, the on and off states of the connection switch 115e are controlled with a control signal C6 fed from the control unit 111. Specifically, initially, the connection switch 115d is placed in the on (connected) state, and the connection switch 115e is placed in the off (unconnected) state. Thereafter, when request information requesting feed of power is transmitted from the source equipment 110A to the sink equipment 120A, the connection switch 115d is set to the off state and the connection switch 115e is set to the on state.

The switching circuit 115A of the source equipment 110A has the foregoing configuration, and power feed from the sink equipment 120A to the sink equipment 110A is performed as described below. Specifically, the connection switch 115d of the source equipment 110A is placed in the on state and the connection switch 115e thereof is placed in the off state. Power is fed from the power circuit 126A of the sink equipment 120A to the source equipment 110A over the reserved line of the HDMI cable 130. Further, the selection switches 127a and 127b of the sink equipment 120A have the sides b thereof connected.

Power fed from the power circuit 126A of the sink equipment 120A is therefore fed to the source equipment 110A over the reserved line of the HDMI cable 130. In the source equipment 110A, the power fed from the sink equipment 120A over the reserved line of the HDMI cable 130 is fed to the internal circuits via the diode 115f through the 14 pin of the HDMI terminal 116. In the source equipment 110A, the power fed from the sink equipment 120A over the reserved line of the HDMI cable 130 is fed to the 18 pin of the HDMI terminal 116 through the 14 pin of the HDMI terminal 116 via the connection switch 115d.

The power is then fed to the sink equipment 120A over the power line of the HDMI cable 130. In the sink equipment 120A, the power fed from the source equipment 110A over the power line of the HDMI cable 130 is fed to the internal circuits through the 18 pin of the HDMI terminal 121 via the selection switch 127a of the switching circuit 127.

Thereafter, when request information requesting feed of power is transmitted from the source equipment 110A to the sink equipment 120A, the connection switch 115d of the source equipment 110A is set to the off state and the connection switch 115e is set to the on state. The selection switches 127a and 127b of the sink equipment 120A have the sides a thereof connected. Therefore, power fed from the power circuit 126A of the sink equipment 120A is fed to the internal circuits of the sink equipment 120A via the selection switch 127a of the switching circuit 127. The power fed from the power circuit 126A of the sink equipment 120A is fed to the 18 pin of the HDMI terminal 121 via the selection switch 127b of the switching circuit 127, and further fed to the source equipment 110A side over the power line of the HDMI cable 130.

In the source equipment 110A, power is fed to the internal circuits via the diode 115g and connection switch 115e through the 18 pin of the HDMI terminal 116. In this case, to the internal circuits of the source equipment 110A, power is fed from the power circuit 126A of the sink equipment 120A over both the reserved line and power line of the HDMI cable 130. Therefore, a case where an amount of current necessary for the source equipment 110A is large can be coped with. Request information is transmitted from the source equipment 110A to the sink equipment 120A in a case where, for example, as long as only power fed over the reserved line is used, the amount of current falls short.

Next, request information on power feed to be transmitted from the source equipment 110A to the sink equipment 120A will be described below. The request information on power feed is transmitted from the source equipment 110A to the sink equipment 120A on the basis of a user's manipulation or action information according to, for example, any of the first to fourth control methods described below.

(1) First Control Method

The source equipment 110A transmits request information on power feed to the sink equipment 120A using a power feed line of the HDMI cable 130. In this case, the control unit 111 of the source equipment 110A changes the voltage at the 18 pin of the HDMI terminal 116 from a high level to a low level, and thus transmits the request information on power feed to the sink equipment 120A. In this case, the control unit 122 of the sink equipment 120A monitors the voltage at the 18 pin of the HDMI terminal 121. When the voltage changes the level thereof from the high level to the low level, the control unit 122 decides that the request information on power feed has been sent from the source equipment 110A.

The sink equipment 120A monitors the current value at the 18 pin of the HDMI terminal 121. When the current value changes the level thereof from the high level to the low level, the sink equipment 120A decides that request information on power feed suspension has been sent from the source equipment 110A. At this time, the state of power feed in the source equipment 110A and sink equipment 120A is returned to the initial state.

Figure 17:
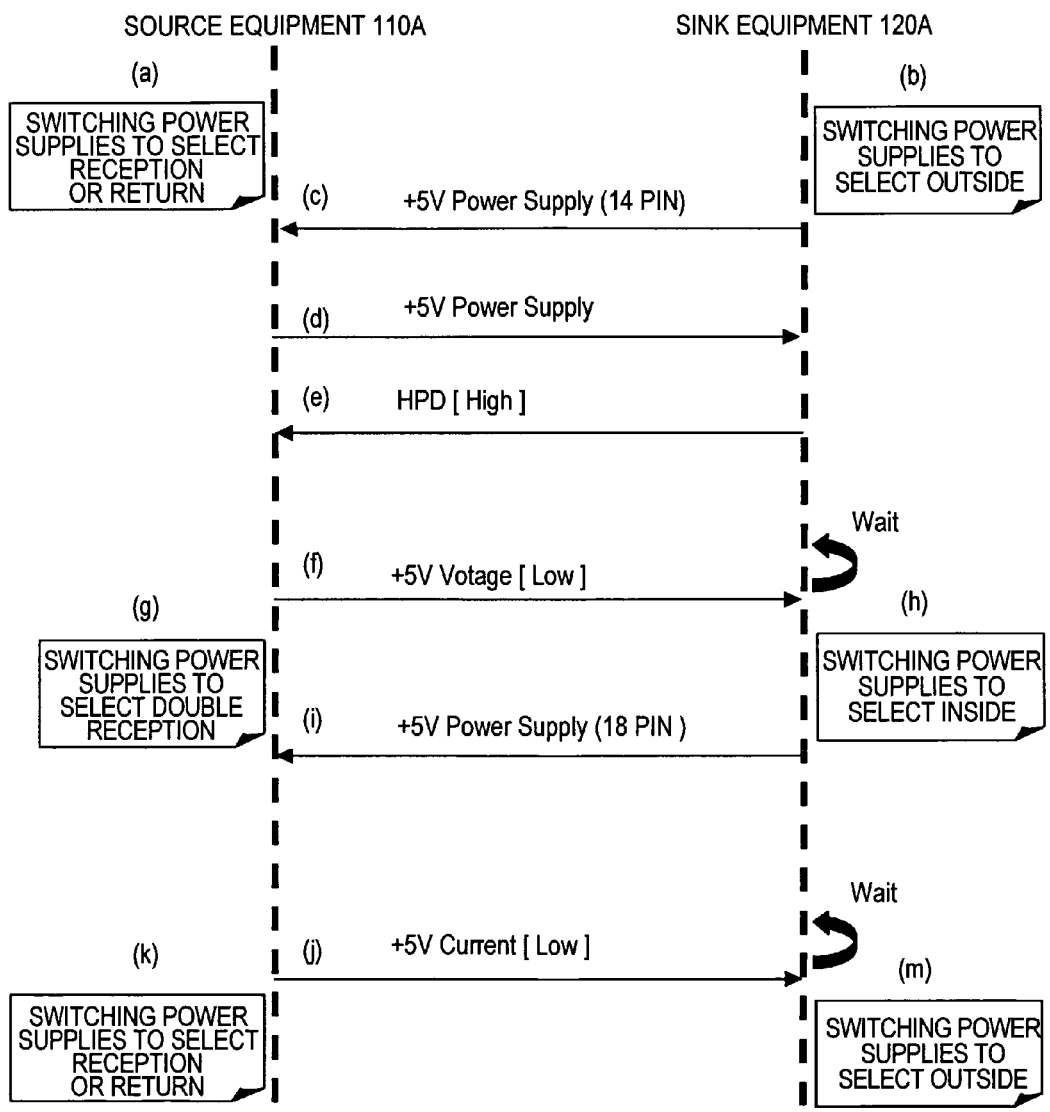
FIG. 17 is a diagram showing an example of a control sequence to be implemented in a case (first control method) where request information on power feed is transmitted from source equipment to sink equipment over a power feed line of an HDMI cable.

FIG. 17 shows an example of a control sequence implemented in the first control method.

(a) The connection switch 115d of the switching circuit 115A of the source equipment 110A is placed in the on state, and the connection switch 115e thereof is placed in the off state (receiving or returning state). (b) The selection switches 127a and 127b of the switching circuit 127 of the sink equipment 120A have the sides b thereof connected (outside selecting state). In this state, if the sink equipment 120A is connected to the source equipment 110A over the HDMI cable 130, (c) power of +5 V fed from the power circuit 126A of the sink equipment 120A is fed to the source equipment 110A over the reserved line of the HDMI cable 130. The power is fed to the internal circuits of the source equipment 110A, and (d) is also fed to the sink equipment 120A over the power line of the HDMI. In the sink equipment 120A, the power is fed to the internal circuits.

(e) In this case, the voltage at the 19 pin (HPD) of the HDMI terminal 121 of the sink equipment 120A rises, and the voltage at the 19 pin (HPD) of the HDMI terminal 116 of the source equipment 110A rises accordingly. Therefore, the control unit 111 of the source equipment 110A recognizes that the sink equipment 120A has been connected.

(f) Thereafter, based on a user's manipulation or action information, the source equipment 110A changes the voltage at the 18 pin of the HDMI terminal 116 from the high level to the low level, and thus transmits request information on power feed to the sink equipment 120A. (g) Accordingly, the source equipment 110A has the connection switch 115d thereof placed in the off state and the connection switch 115e thereof placed in the on state (double receiving state), and (h) the sink equipment 120A has the selection switches 127a and 127b of the switching circuit 127 thereof brought to the state in which the sides a of the connection switches are connected (inside selecting state).

(i) Eventually, power of +5 V fed from the power circuit 126A of the sink equipment 120A is fed to the source equipment 110A over the power line of the HDMI cable 130. In the source equipment 110A, the power is fed to the internal circuits. In this state, the power is fed from the power circuit 126A of the sink equipment 120A to the internal circuits of the source equipment 110A over both the reserved line and power line of the HDMI cable 130. Incidentally, to the internal circuits of the sink equipment 120A, the power of +5 V fed from the power circuit 126A of the sink equipment 120A is fed.

(j) Thereafter, when power over the power line becomes unnecessary for the source equipment 110A, the current value at the 18 pin of each of the HDMI terminals 116 and 121 is changed from the high level to the low level. Therefore, the sink equipment 120A decides that request information on power feed suspension has been sent from the source equipment 110A, or the source equipment 110A decides that the request information on power feed suspension has been sent to the sink equipment 120A.

(k) Accordingly, the source equipment 110A brings the connection switch 115d of the switching circuit 115A back to the on state, and brings the connection switch 115e thereof back to the off state (receiving or returning state). (m) The sink equipment 120A brings the selection switches 127a and 127b of the switching circuit 127 back to the state in which the sides b of the selection switches are connected (outside selecting state). Eventually the state of power feed from the sink equipment 120A to the source equipment 110A is returned to the initial state.

(2) Second Control Method

The source equipment 110A transmits request information on power feed to the sink equipment 120A using the CEC line of the HDMI cable 130. Specifically, the source equipment 110A transmits a power feed request to the sink equipment 120A. The sink equipment 120A sends a power feed response relevant to the request to the source equipment 110A. The sink equipment 120A returns the power feed response, which contains availability information on each of a voltage value and a current value specified in the power feed request, to the source equipment 110A. When power feed signified by the power feed request can be achieved, the sink equipment 120A enters the state in which power is fed to the source equipment 110A over the power line of the HDMI cable 130.

When feed of power from the sink equipment 120A over the power line of the HDMI cable 130 becomes unnecessary, the source equipment 110A transmits request information on power feed suspension using the CEC line of the HDMI cable 130. Specifically, the source equipment 110A transmits a power feed request, which signifies that power feed is unnecessary (voltage value=0, current value=0), to the sink equipment 120A. At this time, the state of power feed from the sink equipment 120A to the source equipment 110A is returned to the initial state. The CEC commands employed in the second control method are listed in FIG. 8.

Figure 18:
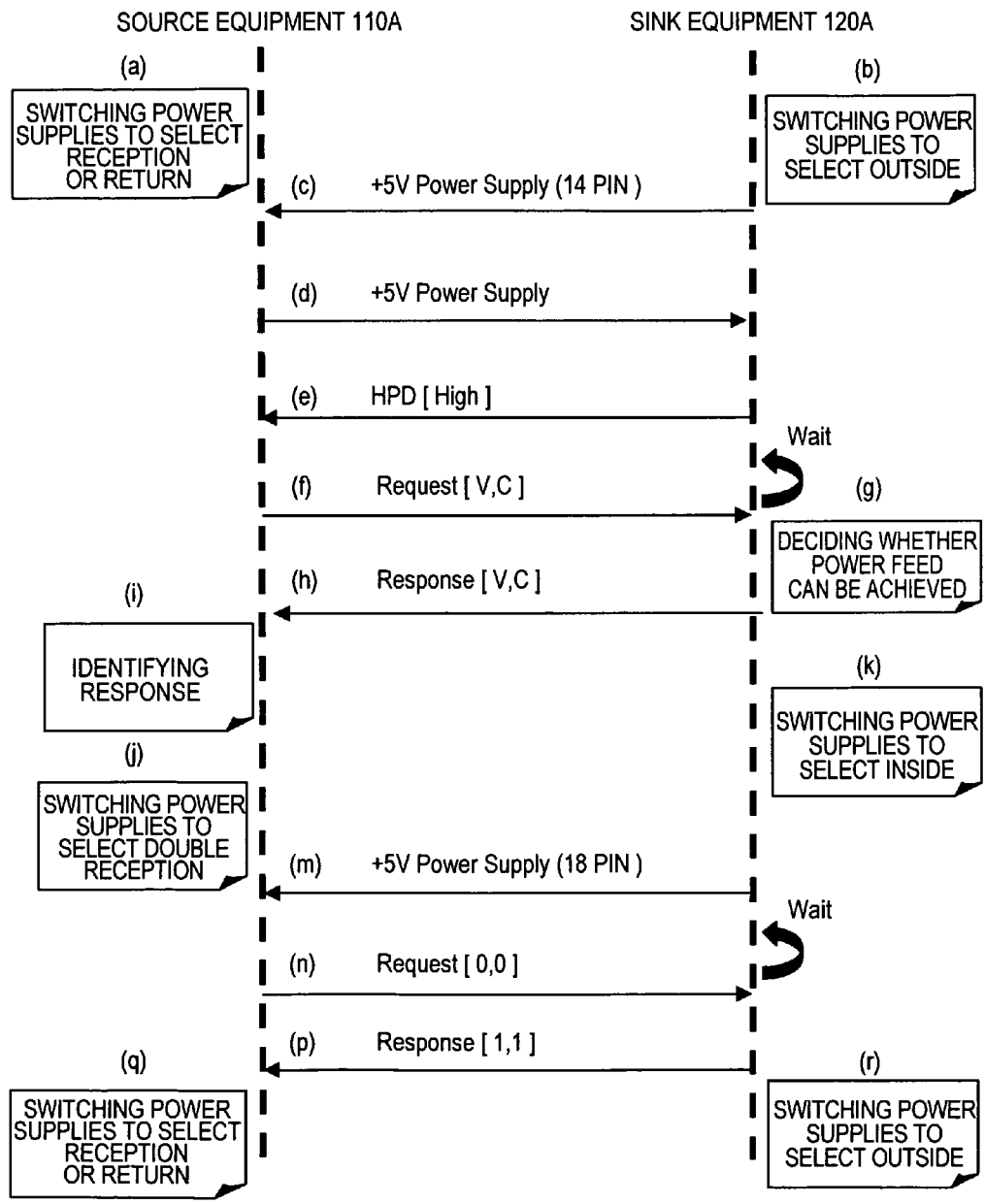
FIG. 18 is a diagram showing an example of a control sequence to be implemented in a case (second control method) where request information on power feed is transmitted from the source equipment to the sink equipment over a CEC line of the HDMI cable.

FIG. 18 shows an example of a control sequence implemented in the second control method.

(a) The connection switch 115d of the switching circuit 115A of the source equipment 110A is placed in the on state, and the connection switch 115e thereof is placed in the off state (receiving or returning state), and (b) the selection switches 127a and 127b of the switching circuit 127 of the sink equipment 120A are brought to the state in which the sides b thereof are connected (outside selecting state). When the sink equipment 120A is connected to the source equipment 110A over the HDMI cable 130, (c) power of +5 V fed from the power circuit 126A of the sink equipment 120A is fed to the source equipment 110A over the reserved line of the HDMI cable 130. In the source equipment 110A, the power is fed to the internal circuits. (d) The power is also fed to the sink equipment 120A over the power line of the HDMI. In the sink equipment 120A, the power is fed to the internal circuits.

(e) In this case, the voltage at the 19 pin (HPD) of the HDMI terminal 121 of the sink equipment 120A rises, and the voltage at the 19 pin (HPD) of the HDMI terminal 116 of the source equipment 110A rises accordingly. Therefore, the control unit 111 of the source equipment 110A recognizes that the sink equipment 120A has been connected.

(f) Thereafter, based on a user's manipulation or action information, the source equipment 110A transmits the command <Request Power Supply>, which is a power feed request, to the sink equipment 120A over the CEC line. (g) The sink equipment 120A decides whether feed of a voltage value and a current value requested with the command <Request Power Supply> can be achieved, and (h) transmits the command <Response Power Supply>, which is a power feed response containing the result of the decision, to the source equipment 110A over the CEC line.

(i) The source equipment 110A identifies the command <Response Power Supply> sent from the sink equipment 120A. (j) If the command is a response signifying that feed can be achieved, the connection switch 115d of the switching circuit 115A is set to the off state, and the connection switch 115e thereof is set to the on state (double receiving state).

(k) If feed of the requested voltage value and current value can be achieved, the sink equipment 120A controls the power fed from the power circuit 126A so that the voltage value and current value of the power will correspond to the voltage value and current value requested by the source equipment 110A, and brings the selection switches 127a and 127b of the switching circuit 127 to the state in which the sides a of the selection switches are connected (inside selecting state).

(m) Accordingly, power of +5 V fed from the power circuit 126A of the sink equipment 120A is fed to the source equipment 110A over the power line of the HDMI cable 130. In the source equipment 110A, the power is fed to the internal circuits. In this state, the power is fed from the power circuit 126A of the sink equipment 120A to the internal circuits of the source equipment 110A over both the reserved line and power line of the HDMI cable 130. Incidentally, to the internal circuits of the sink equipment 120A, the power of +5 V fed from the power circuit 126A of the sink equipment 120A is fed.

(n) Thereafter, when power fed over the power line of the HDMI cable 130 becomes unnecessary for the source equipment 110A, the source equipment 110A transmits the command <Request Power Supply>, which signifies that power feed is unnecessary, to the sink equipment 120A. (p) The sink equipment 120A detects the command <Request Power Supply>, and returns the command <Response Power Supply> to the source equipment 110A. (q) Accordingly, the source equipment 110A brings the connection switch 115d of the switching circuit 115A to the on state, and brings the connection switch 115e thereof to the off state (receiving or returning state). (r) The sink equipment 120A brings the selection switches 127a and 127b of the switching circuit 127 back to the state in which the sides b of the selection switches are connected (outside selecting state). Eventually, the state of power feed from the sink equipment 120A to the source equipment 110A is returned to the initial state.

(3) Third Control Method

The source equipment 110A uses the aforesaid high-speed bidirectional communication means to transmit request information on power feed to the sink equipment 120A. The precondition for the third control method is such that a high-speed bidirectional communication method identical to or similar to the high-speed bidirectional communication means 400 shown in FIG. 10 should be formed in the source equipment 110A and sink equipment 120A.

The source equipment 110A uses the high-speed bidirectional communication means to transmit a power feed request to the sink equipment 120A. The sink equipment 120A uses the high-speed bidirectional communication means to send a power feed response relevant to the request to the source equipment 110A. The sink equipment 120A returns the power feed response, which contains availability information on each of the voltage value and current value specified in the power feed request, to the source equipment 110A. When power feed signified by the power feed request can be achieved, the sink equipment 120A enters the state in which power is fed to the source equipment 110A over the power line of the HDMI cable 130.

When feed of power from the sink equipment 120A over the power line of the HDMI cable 130 becomes unnecessary, the source equipment 110A transmits request information on power feed suspension. Specifically, the source equipment 110A transmits a power feed request, which signifies that power feed is unnecessary (voltage value=0, current value=0), to the sink equipment 120A. At this time, the state of power feed from the sink equipment 120A to the source equipment 110A is returned to the initial state.

Figure 19:
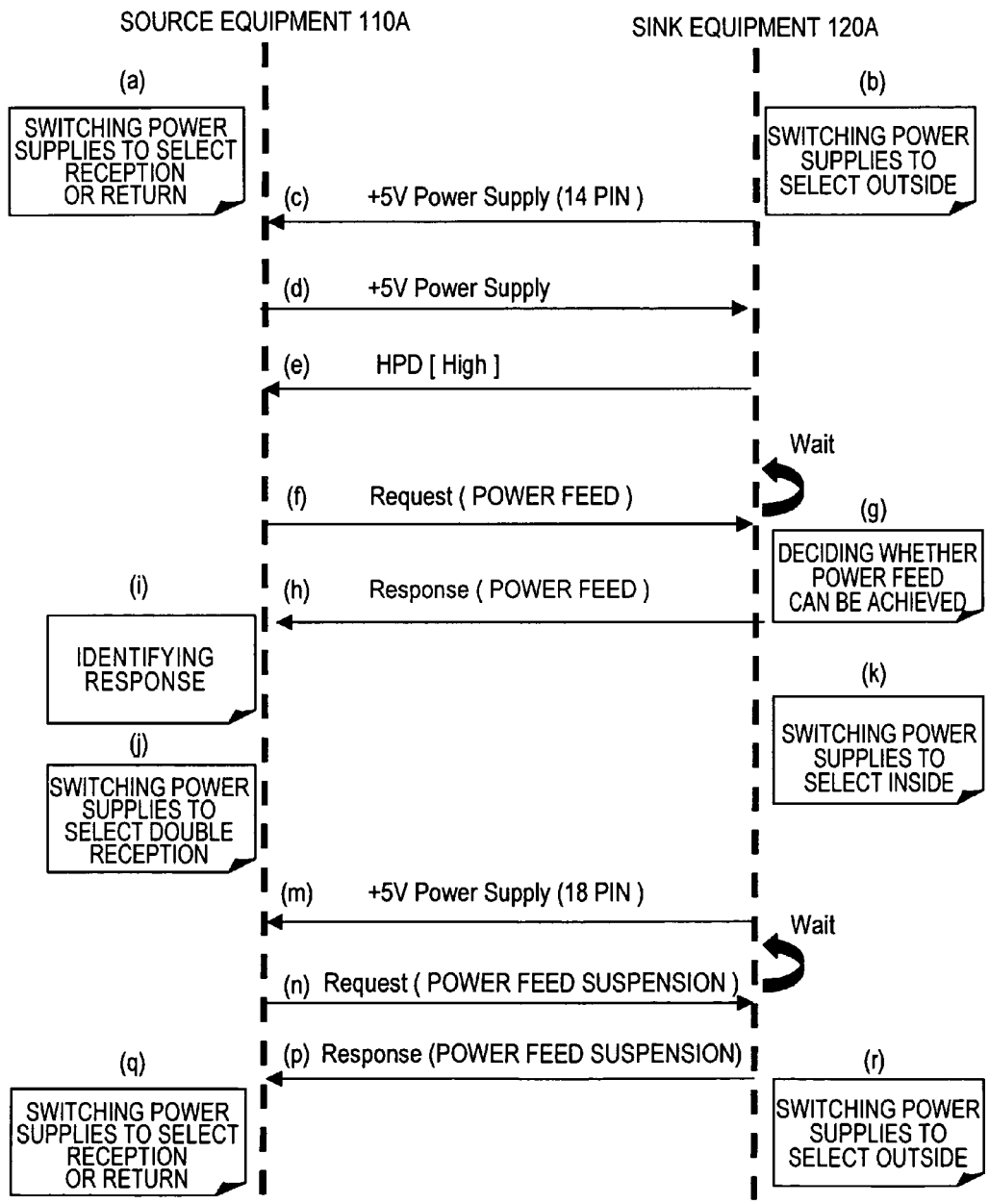
FIG. 19 is a diagram showing an example of a control sequence to be implemented in a case (third control method) where request information on power feed is transmitted from the source equipment to the sink equipment using a high-speed bidirectional communication means.

FIG. 19 shows an example of a control sequence implemented in the third control method.

(a) The selection switch 115d of the switching circuit 115A of the source equipment 110A is placed in the on state and the connection switch 115e thereof is placed in the off state (receiving or returning state). (b) The selection switches 127a and 127b of the switching circuit 127 of the sink equipment 120A are brought to a state in which the sides b of the selection switches are connected (outside selecting state). If the sink equipment 120A is connected to the source equipment 110A over the HDMI cable 130, (c) power of +5 V fed from the power circuit 126A of the sink equipment 120A is fed to the source equipment 110A over the reserved line of the HDMI cable 130. In the source equipment 110A, the power is fed to the internal circuits. (d) The power is fed to the sink equipment 120A over the power line of the HDMI. In the sink equipment 120A, the power is fed to the internal circuits.

(e) In this case, the voltage at the 19 pin (HPD) of the HDMI terminal 121 of the sink equipment 120A rises, and the voltage at the 19 pin (HPD) of the HDMI terminal 116 of the source equipment 110A rises accordingly. Therefore, the control unit 111 of the source equipment 110A recognizes that the sink equipment 120A has been connected.

(f) Thereafter, based on a user's manipulation or action information, the source equipment 110A transmits a request, which requests power supply (similarly to the command <Request Power Supply> to be transmitted over the CEC line, containing pieces of information on a requested voltage value and current value), to the sink equipment 120A by way of the high-speed bidirectional communication means. (g) The sink equipment 120A decides whether feed of the voltage value and current value requested with the request can be achieved. (h) The sink equipment 120A transmits a response, which contains the result of the decision, to the source equipment 110A by way of the high-speed bidirectional communication means.

(i) The source equipment 110A identifies the power feed response sent from the sink equipment 120A. (j) If the response is a response signifying that feed can be achieved, the source equipment brings the connection switch 115d of the switching circuit 115A thereof to the off state, and brings the connection switch 115e thereof to the on state (double receiving state).

(k) If feed of the requested voltage value and current value can be achieved, the sink equipment 120A controls power fed from the power circuit 126A so that the voltage value and current value of the power will correspond to the voltage value and current value requested by the source equipment 110A, and brings the selection switches 127a and 127b of the switching circuit 127 to the state in which the sides a of the selection switches are connected (inside selecting state).

(m) Accordingly, power of +5 V fed from the power circuit 126A of the sink equipment 120A is fed to the source equipment 110A over the power line of the HDMI cable 130. In the source equipment 110A, the power is fed to the internal circuits. In this state, the power is fed from the power circuit 126A of the sink equipment 120A to the internal circuits of the source equipment 110A over both the reserved line and power line of the HDMI cable 130. Incidentally, to the internal circuits of the sink equipment 120A, the power of +5 V fed from the power circuit 126A of the sink equipment 120A is fed.

(n) Thereafter, when the power fed over the power line of the HDMI cable 130 becomes unnecessary for the source equipment 110A, the source equipment 110A transmits a request, which requests power feed suspension, to the sink equipment 120A. (p) The sink equipment 120A detects the power feed suspension request, and returns a response to the source equipment 110A. (q) Accordingly, the source equipment 110A brings the connection switch 115d of the switching circuit 115A back to the on state, and brings the connection switch 115e thereof back to the off state (receiving or returning state). (r) The sink equipment 120A brings the selection switches 127a and 127b of the switching circuit 127 back to the state in which the sides b of the selection switches are connected (outside selecting state). Eventually, the state of power feed from the sink equipment 120A to the source equipment 110A is returned to the initial state.

(4) Fourth Control Method

The source equipment 110A inserts request information into the blanking period of a video signal to be transmitted on the TMDS channel conformable to the HDMI, and transmits the request information to the sink equipment 120A. For example, source product description (SPD) InfoFrame conformable to the HDMI is conceivably used to insert the request information into the blanking period of the video signal to be transmitted on the TMDS channel.

In this case, the control unit 111 of the source equipment 110A describes a specific vendor name, for example, ABCD in the vendor name field (Vendorname Character field) of the SPD InfoFrame. The control unit 122 of the sink equipment 120A monitors the vendor name field of the SPD InfoFrame. When the specific vendor name is described, the sink equipment decides that the request information on power feed has been sent from the source equipment 110A. The specific vendor name is not limited to a certain vendor name but may be any of multiple vendor names.

Figure 20:
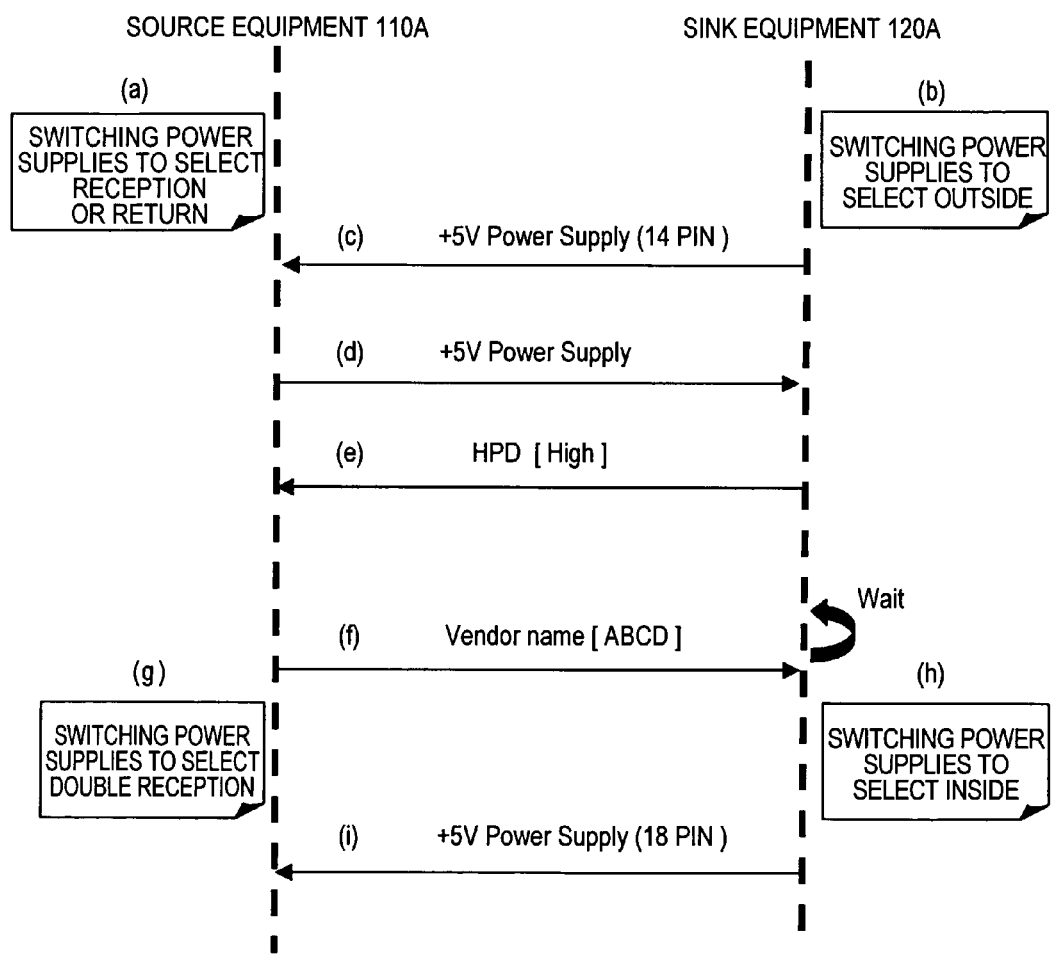
FIG. 20 is a diagram showing an example of a control sequence to be implemented in a case (fourth control method) where request information on power feed is transmitted using SPD InfoFrame.
Figure 21:
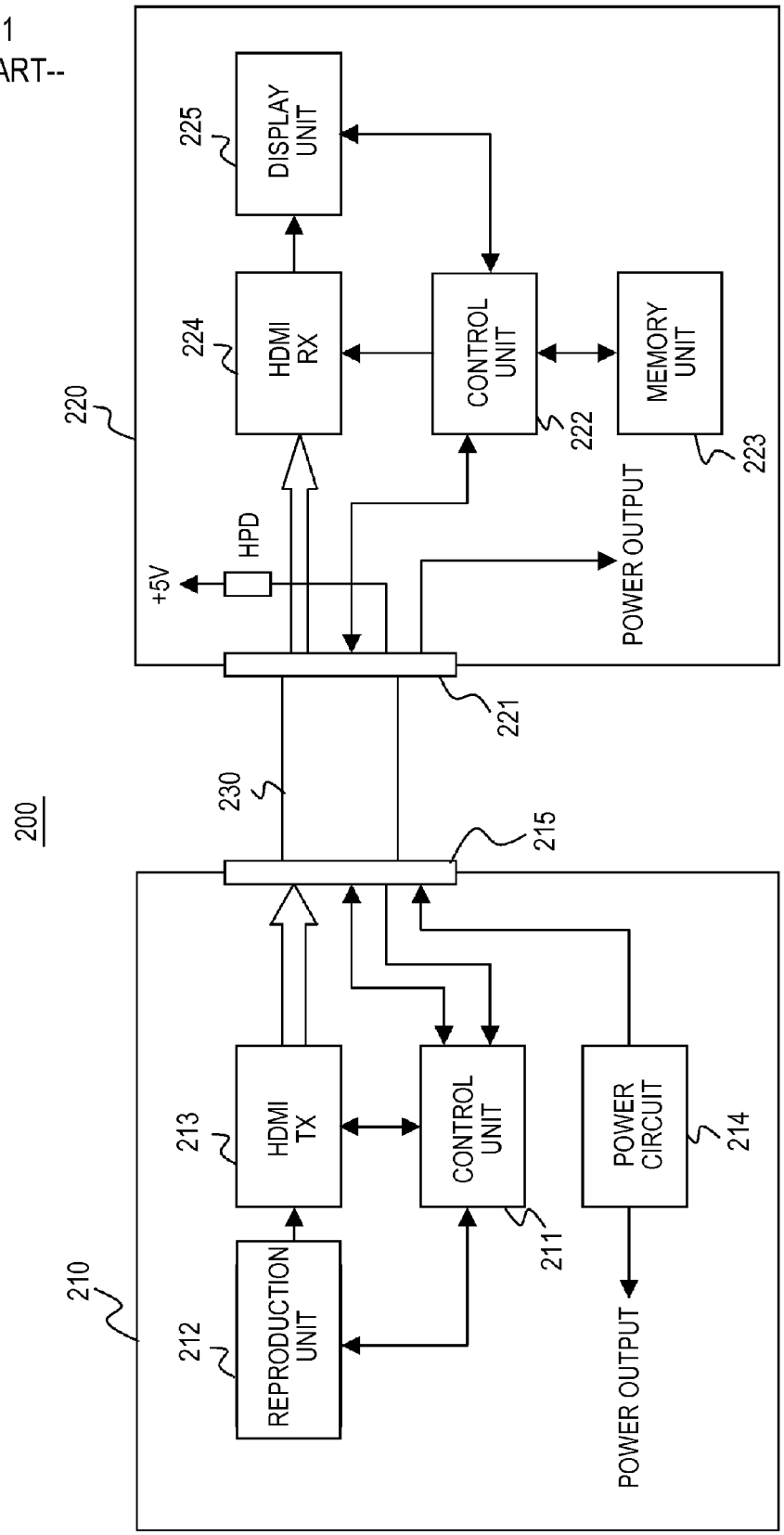
FIG. 21 is a block diagram showing an example of the configuration of a conventional communication system employing an HDMI interface.

FIG. 20 shows an example of a control sequence implemented in the fourth control method.

(a) The connection switch 115d of the switching circuit 115A of the source equipment 110A is placed in the on state, and the connection switch 115e thereof is placed in the off state (receiving or returning state). (b) The selection switches 127a and 127b of the switching circuit 127 of the sink equipment 120A are brought to the state in which the sides b of the selection switches are connected (outside selecting state). If the sink equipment 120A is connected to the source equipment 110A over the HDMI cable 130, (c) power of +5 V fed from the power circuit 126A of the sink equipment 120A is fed to the source equipment 110A over the reserved line of the HDMI cable 130. In the source equipment 110A, the power is fed to the internal circuits. (d) The power is fed to the sink equipment 120A over the power line of the HDMI. In the sink equipment 120A, the power is fed to the internal circuits.

(e) In this state, the voltage at the 19 pin (HPD) of the HDMI terminal 121 of the sink equipment 120A rises, and the voltage at the 19 pin (HPD) of the HDMI terminal 116 of the source equipment 110A rises accordingly. Therefore, the control unit 111 of the source equipment 110A recognizes that the sink equipment 120A has been connected.

(f) Thereafter, a video signal having SPD InfoFrame, which has a vendor name, for example, ABCD described in the vendor name field thereof, inserted into the blanking period thereof is fed from the source equipment 110A to the sink equipment 120A on the TMDS channel conformable to the HDMI. Thus, request information on power feed is sent from the source equipment 110A to the sink equipment 120A. Herein, the specific vendor name is described in the vendor name field on the basis of a setting, a user's manipulation, or action information. (g) Accordingly, the source equipment 110A has the connection switch 115d of the switching circuit 115A thereof placed in the off state and the connection switch 115e thereof placed in the on state (double receiving state). (h) The sink equipment 120A has the selection switches 127a and 127b of the switching circuit 127 thereof brought to the state in which the sides a of the selection switched are connected (inside selecting state).

(i) Eventually, power of +5 V fed from the power circuit 126A of the sink equipment 120A is fed to the source equipment 110A over the power line of the HDMI cable 130. In the source equipment 110A, the power is fed to the internal circuits. In this state, the power is fed from the power circuit 126A of the sink equipment 120A to the internal circuits of the source equipment 110A over both the reserved line and power line of the HDMI cable 130. Incidentally, to the internal circuits of the sink equipment 120A, the power of +5 V fed from the power circuit 126A of the sink equipment 120A is fed.

As mentioned above, assuming that a specific vendor name is described in the vendor name field of SPD InfoFrame, when power is fed from the sink equipment 120A to the source equipment 110A over the power line of the HDMI cable 130, if the source equipment 110A of a specific maker is connected to the sink equipment 120A, the power is fed from the sink equipment 120A to the source equipment 110A over both the reserved line and power line of the HDMI cable 130.

As described previously, in the communication system 100A shown in FIG. 15, power is fed from the sink equipment 120A to the source equipment 110A over the reserved line of the HDMI cable 130. In the source equipment 110A, the power is fed to the internal circuits. The power is fed to the sink equipment 120A over the power line of the HDMI cable 130. Therefore, the source equipment 110A may not have the power circuit.

In the communication system 100A shown in FIG. 15, power is fed from the sink equipment 120A to the source equipment 110A over the power line of the HDMI cable 130 in response to a request for power feed sent from the source equipment 110A. In the source equipment 110A, the power is fed to the internal circuits. In this case, to the internal circuits of the source equipment 110A, the power is fed from the power circuit 126A of the sink equipment 120A over both the reserved line and power line of the HDMI cable 130. Therefore, a case where an amount of current necessary for the source equipment 110A is large can be coped with successfully.

In the aforesaid embodiments, a description has been made on the assumption that an interface conformable to the HDMI specifications is adopted for transmission lines linking pieces of equipment. Needless to say, the present invention can be applied to any other similar specifications for transmission.

Industrial Applicability

The present invention makes it possible to simplify a power circuit of sink equipment connected to source equipment, and can be applied to battery-driven mobile equipment to be connected to a television set having a satisfactory power circuit, reproduction equipment devoid of a power circuit, or the like.

The invention claimed is:
1. A transmitting apparatus comprising:
a signal transmitting unit that transmits a video signal to a receiving apparatus over a cable in the form of differential signals on a plurality of channels;
a control unit that transmits request information, which requests feed of power, to the receiving apparatus over the cable;
a power supply switching unit that feeds power, which is fed from the receiving apparatus over the cable, to internal circuits along with the transmission of the request information from the control unit; and
a power feeding unit that, in one state, feeds power, which is fed from the receiving apparatus over a first line included in the cable, simultaneously (i) to the internal circuits and (ii) via a connection switch of the transmitting apparatus which selectively connects the first line with a second line included in the cable under control of the control unit, to the receiving apparatus over the second line,
the first line being coupled to a first circuit of the receiving apparatus and the second line being coupled to the first circuit through a second circuit of the receiving apparatus.

2. The transmitting apparatus according to claim 1, further comprising:
a power circuit;
wherein the power feeding unit feeds power fed from the power circuit to the receiving apparatus over the cable, wherein
the power supply switching unit feeds power, which is fed from the receiving apparatus over the cable, to the internal circuits in place of power, which is fed from the power circuit, along with the transmission of the request information from the control unit.

3. The transmitting apparatus according to claim 1, wherein
the power supply switching unit feeds both of power, which is fed from the receiving apparatus over the second line included in the cable, and the power, which is fed from the receiving apparatus over the first line included in the cable, to the internal circuits along with the transmission of the request information from the control unit.

4. The transmitting apparatus according to claim 1, wherein the control unit transmits the request information using a predetermined line out of a plurality of lines constituting the cable other than a line to be used to transmit the video signal and a line to be used to feed power.

5. The transmitting apparatus according to claim 1, wherein the control unit transmits the request information using a line, which is used to feed power, out of a plurality of lines constituting the cable.

6. The transmitting apparatus according to claim 1, wherein the control unit transmits the request information using a line, which is used to transmit a control signal, out of a plurality of lines constituting the cable.

7. The transmitting apparatus according to claim 1, wherein the control unit transmits the request information using a high-speed bidirectional communication means that employs predetermined lines out of a plurality of lines, which constitutes the cable, other than a line to be used to transmit the video signal and a line to be used to feed power.

8. The transmitting apparatus according to claim 7, wherein the predetermined lines refer to a reserved line and an HPD line included in the HDMI cable.

9. The transmitting apparatus according to claim 1, wherein the control unit inserts the request information into the blanking period of the video signal to be transmitted from the signal transmitting unit, and transmits the request information to the receiving apparatus.

10. The transmitting apparatus according to claim 1, wherein the request information to be transmitted by the control unit contains at least control information on a voltage value or a current value.

11. A power supply switching method for a transmitting apparatus including a signal transmitting unit that transmits a video signal to a receiving apparatus over a cable in the form of differential signals on a plurality of channels, comprising:
an information transmitting step of transmitting, by a control unit of the transmitting apparatus, request information, which requests feed of power, to the receiving apparatus over the cable; and
a power supply switching step of feeding power, which is fed from the receiving apparatus over the cable, to internal circuits along with the transmission of the request information at the information transmitting step,
wherein the power supply switching step, in one state, feeds power, which is fed from the receiving apparatus over a first line included in the cable, simultaneously to the internal circuits, and, based on whether the request information is transmitted by the control unit to the receiving apparatus over the cable, via a connection switch of the transmitting apparatus which selectively connects the first line with a second line included in the cable under control of the control unit, to the receiving apparatus over the second line,
the first line being coupled to a first circuit of the receiving apparatus and the second line being coupled to the first circuit through a second circuit of the receiving apparatus.

12. A transmitting apparatus comprising:
a signal transmitting unit that transmits a video signal to a receiving apparatus over a cable in the form of differential signals on a plurality of channels; and
a power feeding unit that, in one state, feeds power fed from the receiving apparatus over a first line included in the cable simultaneously (i) to internal circuits and (ii) via a connection switch of the transmitting apparatus which selectively connects the first line with a second line included in the cable under control of the transmitting apparatus, to the receiving apparatus over the second line,
the first line being coupled to a first circuit of the receiving apparatus and the second line being coupled to the first circuit through a second circuit of the receiving apparatus.

13. A receiving apparatus comprising:
a signal receiving unit that receives a video signal, which is sent over a cable in the form of differential signals on a plurality of channels, from a transmitting apparatus;
a power obtaining unit that obtains power fed from the transmitting apparatus over the cable;
a power circuit, the power fed from the transmitting apparatus is, in one state of the transmitting apparatus, power fed from the power circuit over a first line included in the cable to the transmitting apparatus fed simultaneously (i) to internal circuits of the transmitting apparatus and (ii) via a connection switch of the transmitting apparatus which selectively connects the first line with a second line included in the cable under control of the transmitting apparatus, to the second line;
control unit that receives request information which is sent from the transmitting apparatus over the cable in order to request feed of power; and
a power feeding circuit through which the power fed from the power circuit is fed to the transmitting apparatus over the second line included in the cable, the power feeding circuit feeding the reception of the request information by the control unit,
the first line being coupled to the power circuit and the second line being coupled to the power circuit through the power feeding circuit.

14. The receiving apparatus according to claim 13, wherein the request information received by the control unit contains at least control information on a voltage value or a current value, further comprising:
a power control unit that controls the power, which is fed from the power circuit to the transmitting apparatus through the power feeding unit, on the basis of the control information.

15. A power feeding method for a receiving apparatus including a signal receiving unit that receives a video signal, which is sent over a cable in the form of differential signals on a plurality of channels, from a transmitting apparatus, a power obtaining unit that obtains power fed from the transmitting apparatus over the cable, a power circuit and a second circuit, comprising:

an information receiving step of receiving, by a control unit, request information that is sent from the transmitting apparatus over the cable in order to request feed of power; and a power feeding step of feeding the power fed from the power circuit to the transmitting apparatus over the cable along with the reception of the request information at the information receiving step, wherein the power fed from the transmitting apparatus is, in one state of the transmitting apparatus, power fed over a first line included in the cable to the transmitting apparatus fed simultaneously (i) to internal circuits of the transmitting apparatus and (ii) via a connection switch of the transmitting apparatus which selectively connects the first line with a second line included in the cable under control of the transmitting apparatus, to the second line, the first line being coupled to the power circuit and the second line being coupled to the power circuit through the second circuit.

16. A receiving apparatus comprising:

a signal receiving unit that receives a video signal, which is sent over a cable in the form of differential signals on a plurality of channels, from a transmitting apparatus;

a power obtaining unit that obtains power fed from the transmitting apparatus over the cable;

a power circuit;

a control unit that receives request information which is sent from the transmitting apparatus over the cable in order to request feed of power; and a power feeding unit that feeds the power fed from the power circuit to the transmitting apparatus over a second line included in the cable, and that when the request information is received by the control unit, feeds the power fed from the power circuit to the transmitting apparatus over a first line included in the cable while the power fed from the power circuit is fed to the transmitting apparatus over the second line, in which the power fed from the transmitting apparatus is, in one state of the transmitting apparatus, power fed from the power circuit over the first line to the transmitting apparatus fed simultaneously (i) to internal circuits of the transmitting apparatus and (ii) via a connection switch of the transmitting apparatus which selectively connects the first line with the second line under control of the transmitting apparatus, to the second line, the first line being coupled to the power circuit and the second line being coupled to the power circuit through a second circuit of the receiving apparatus.

17. The receiving apparatus according to claim 16, wherein the request information received by the control unit contains at least control information on a voltage value or a current value, further comprising:

a power control unit that controls the power, which is fed from the power circuit to the transmitting apparatus through the power feeding unit, on the basis of the control information.

18. A power feeding method for a receiving apparatus including a signal receiving unit that receives a video signal, which is sent over a cable in the form of differential signals on a plurality of channels, from a transmitting apparatus, a power obtaining unit that obtains power fed from the transmitting apparatus over the cable, power circuit and a second circuit, comprising:

a first power feeding step of feeding power fed from the power circuit to the transmitting apparatus over a first line included in the cable;

an information receiving step of receiving, by a control unit, request information which is sent from the transmitting apparatus over the cable in order to request feed of power; and a second power feeding step of, while the power fed from the power circuit is fed to the transmitting apparatus over the first line included in the cable, when the request information is received at the information receiving step, feeding the power fed from the power circuit to the transmitting apparatus over a second line included in the cable, in which the power fed from the transmitting apparatus is, in one state of the transmitting apparatus, power fed from the power circuit over the first line to the transmitting apparatus fed simultaneously (i) to internal circuits of the transmitting apparatus and (ii) via a connection switch of the transmitting apparatus which selectively connects the first line with the second line under control of the transmitting apparatus, to the second line, the first line being coupled to the power circuit and the second line being coupled to the power circuit through the second circuit of the receiving apparatus.

19. A receiving apparatus comprising:

a signal receiving unit that receives a video signal, which is sent over a cable in the form of differential signals on a plurality of channels, from a transmitting apparatus;

a power circuit;

a power feeding circuit that feeds power fed from the power circuit to the transmitting apparatus over the cable; and a power obtaining unit that obtains the power fed from the transmitting apparatus over a second line included in the cable, wherein the power fed from the transmitting apparatus over the second line is, in one state of the transmitting apparatus, the power fed from the power circuit to the transmitting apparatus over a first line included in the cable fed simultaneously (i) to internal circuits of the transmitting apparatus and (ii) via a connection switch of the transmitting apparatus which selectively connects the first line with the second line under control of the transmitting apparatus, to the second line, the first line being coupled to the power circuit and the second line being coupled to the power circuit through the power feeding circuit.

* * * * *